(12) United States Patent
Collart et al.

(10) Patent No.: US 8,880,714 B2
(45) Date of Patent: Nov. 4, 2014

(54) METHOD AND SYSTEM FOR USE IN COORDINATING MULTIMEDIA DEVICES

(71) Applicant: Deluxe Digital Studios, Inc., Burbank, CA (US)

(72) Inventors: Todd Collart, Los Altos, CA (US); Allan Lamkin, San Diego, CA (US)

(73) Assignee: Deluxe Media Inc., Burbank, CA (US)

( * ) Notice: Subject to any disclaimer, the term of this patent is extended or adjusted under 35 U.S.C. 154(b) by 0 days.

(21) Appl. No.: 14/030,956

(22) Filed: Sep. 18, 2013

(65) Prior Publication Data

US 2014/0089515 A1 Mar. 27, 2014

Related U.S. Application Data

(63) Continuation of application No. 13/253,887, filed on Oct. 5, 2011, now Pat. No. 8,782,262, which is a continuation of application No. 12/332,238, filed on Dec. 10, 2008, now Pat. No. 8,060,631.

(60) Provisional application No. 61/012,753, filed on Dec. 10, 2007.

(51) Int. Cl.
*G06F 15/16* (2006.01)
*G06F 15/173* (2006.01)
(Continued)

(52) U.S. Cl.
CPC .... *H04L 29/06319* (2013.01); *G11B 20/00797* (2013.01); *G11B 27/34* (2013.01);
(Continued)

(58) Field of Classification Search
CPC ............ G06F 17/30017; G11B 20/00797
USPC ........................................................ 709/229
See application file for complete search history.

(56) References Cited

U.S. PATENT DOCUMENTS

| 5,530,469 A | 6/1996 | Garfinkle |
| 5,898,919 A | 4/1999 | Yuen |

(Continued)

FOREIGN PATENT DOCUMENTS

| EP | 1 524 582 | 4/2005 |
| JP | 10-042050 | 2/1998 |

(Continued)

OTHER PUBLICATIONS

Haartsen; "Bluetooth—The Universal Radio Interface for Ad Hoc, Wireless Connectivity"; Ericsson Review No. 3. 1998; 8 Pages.

(Continued)

*Primary Examiner* — Shaq Taha
(74) *Attorney, Agent, or Firm* — Fitch, Even, Tabin & Flannery LLP

(57) ABSTRACT

Some embodiments of the present invention provide methods for use in playing back content. Some of these methods access a content package comprising media content to be locally played back; detect, as defined by the content package, whether a remote secondary device is available with which a connection can be established; determine whether an authorization to establish the connection has been confirmed; establish, when the authorization is confirmed, a communication connection; determine, as instructed by the content package and when the communication with the secondary device is established, whether one or more commands are received from the secondary device; and implement, as instructed by the content package and when it is determined that the one or more commands are received from the secondary device, the one or more commands in controlling playback experience of the media content.

17 Claims, 14 Drawing Sheets

(51) Int. Cl.
*G11B 27/34* (2006.01)
*G11B 27/10* (2006.01)
*H04N 21/835* (2011.01)
*G06F 17/30* (2006.01)
*H04L 29/06* (2006.01)
*H04N 21/43* (2011.01)
*H04N 21/254* (2011.01)
*G11B 20/00* (2006.01)
*H04N 21/41* (2011.01)
*H04N 21/239* (2011.01)
*H04N 21/2387* (2011.01)
*H04N 21/472* (2011.01)

(52) U.S. Cl.
CPC .... *G11B 20/00746* (2013.01); *G11B 20/00159* (2013.01); *H04N 21/4126* (2013.01); *H04N 21/2396* (2013.01); *G11B 20/00862* (2013.01); *G11B 27/105* (2013.01); *H04N 21/835* (2013.01); *G06F 17/30017* (2013.01); *G11B 20/00659* (2013.01); *G11B 20/00188* (2013.01); *H04N 21/2387* (2013.01); *G11B 2220/2541* (2013.01); *H04N 21/47217* (2013.01); *H04L 65/4084* (2013.01); *G11B 20/00137* (2013.01); *H04N 21/4307* (2013.01); *H04N 21/2541* (2013.01)
USPC .......................... 709/229; 709/228; 709/230

(56) References Cited

U.S. PATENT DOCUMENTS

| | | | |
|---|---|---|---|
| 6,061,719 A | 5/2000 | Bendinelli et al. | |
| 6,326,982 B1 | 12/2001 | Wu et al. | |
| 6,446,130 B1 | 9/2002 | Grapes | |
| 7,032,235 B2 | 4/2006 | Pelkey et al. | |
| 7,099,798 B2 | 8/2006 | Yu et al. | |
| 7,146,632 B2 | 12/2006 | Miller | |
| 7,194,758 B1 | 3/2007 | Waki et al. | |
| 7,392,393 B2 | 6/2008 | Taki | |
| 7,634,734 B2 | 12/2009 | Fuller et al. | |
| 7,792,756 B2* | 9/2010 | Plastina et al. | 705/51 |
| 7,796,190 B2 | 9/2010 | Basso et al. | |
| 7,805,373 B1 | 9/2010 | Issa et al. | |
| 8,060,631 B2 | 11/2011 | Collart et al. | |
| 2002/0068558 A1 | 6/2002 | Janik | |
| 2002/0162121 A1 | 10/2002 | Mitchell | |
| 2003/0005135 A1* | 1/2003 | Inoue et al. | 709/229 |
| 2003/0174818 A1 | 9/2003 | Hazenfield | |
| 2004/0031063 A1 | 2/2004 | Satoda | |
| 2004/0044532 A1 | 3/2004 | Karstens | |
| 2004/0103032 A1 | 5/2004 | Maggio | |
| 2005/0015796 A1 | 1/2005 | Bruckner et al. | |
| 2005/0108026 A1 | 5/2005 | Brierre et al. | |
| 2005/0210101 A1 | 9/2005 | Janik | |
| 2005/0246747 A1 | 11/2005 | Braun et al. | |
| 2005/0262542 A1 | 11/2005 | DeWeese et al. | |
| 2005/0278771 A1 | 12/2005 | Hassell et al. | |
| 2005/0289139 A1 | 12/2005 | Takashima et al. | |
| 2006/0089820 A1 | 4/2006 | Yu et al. | |
| 2006/0095472 A1 | 5/2006 | Krikorian et al. | |
| 2006/0123246 A1 | 6/2006 | Vantalon et al. | |
| 2006/0174308 A1 | 8/2006 | Fuller et al. | |
| 2006/0190559 A1 | 8/2006 | Lim | |
| 2006/0195887 A1 | 8/2006 | Shusman | |
| 2006/0206563 A1 | 9/2006 | Van De Sluis | |
| 2006/0235801 A1 | 10/2006 | Strom | |
| 2007/0077784 A1 | 4/2007 | Kalayjian et al. | |
| 2007/0180485 A1 | 8/2007 | Dua | |
| 2007/0245366 A1 | 10/2007 | Mitsui | |
| 2008/0109556 A1 | 5/2008 | Karlberg | |
| 2008/0244676 A1 | 10/2008 | DaCosta | |
| 2009/0059512 A1 | 3/2009 | Lydon et al. | |
| 2009/0150553 A1 | 6/2009 | Collart et al. | |
| 2009/0228919 A1* | 9/2009 | Zott et al. | 725/34 |
| 2010/0293598 A1 | 11/2010 | Collart et al. | |
| 2012/0030366 A1 | 2/2012 | Collart et al. | |

FOREIGN PATENT DOCUMENTS

| | | |
|---|---|---|
| JP | 2004-013611 | 1/2004 |
| JP | 2005-260322 | 9/2005 |
| JP | 2007-266881 | 11/2007 |
| WO | 03/087961 | 10/2003 |
| WO | 2005/057346 | 6/2005 |
| WO | 2006/103577 | 10/2006 |
| WO | 2009/076474 | 6/2009 |

OTHER PUBLICATIONS

Non-Final Office Action issued in U.S. Appl. No. 11/692,063; Mailed Apr. 29, 2009; 20 Pages.
Non-Final Office Action issued in U.S. Appl. No. 11/692,063; Mailed Nov. 25, 2009; 21 Pages.
Examiner Interview Summary issued in U.S. Appl. No. 11/692,063; Mailed Mar. 1, 2010; 3 Pages.
Final Office Action issued in U.S. Appl. No. 11/692,063; Mailed Apr. 13, 2010; 19 Pages.
Examiner Interview Summary issued in U.S. Appl. No. 11/692,063; Mailed Jul. 12, 2010; 3 Pages.
Non-Final Office Action issued in U.S. Appl. No. 11/692,063; Mailed Nov. 8, 2011; 16 Pages.
Final Office Action issued in U.S. Appl. No. 11/692,063; Mailed Mar. 13, 2012; 16 Pages.
Non-Final Office Action issued in U.S. Appl. No. 12/332,238; Mailed Sep. 29, 2010; 18 Pages.
Final Office Action issued in U.S. Appl. No. 12/332,238; Mailed Mar. 18, 2011; 24 Pages.
Examiner Interview Summary issued in U.S. Appl. No. 12/332,238; Mailed May 18, 2011; 3 Pages.
Examiner Interview Summary issued in U.S. Appl. No. 12/332,238; Mailed Jun. 29, 2011; 2 Pages.
Notice of Allowance issued in U.S. Appl. No. 12/332,238; Mailed Jun. 29, 2011; 20 Pages.
PCT; International Search Report and Written Opinion issued in International Patent Application Serial No. PCT/US2008/086287; Mailed Jun. 24, 2009; 11 Pages.
Australian Patent Office; First Examination Report issued in Australian Patent Application No. 2008335095; Mailed Aug. 14, 2012; 3 Pages.
EPO; Extended European Search Report issued in European Patent Application No. 08860403.8; Mailed Jun. 28, 2013; 13 Pages.
JPO; First Office Action issued in Japanese Patent Application No. 2010-538140; Mailed Jul. 16, 2013; 12 Pages.
Non-Final Office Action issued in U.S. Appl. No. 12/842,001; Mailed Mar. 1, 2013; 15 Pages.
Notice of Allowance issued in U.S. Appl. No. 12/842,001; Mailed Sep. 16, 2013; 6 Pages.
Notice of Allowance issued in U.S. Appl. No. 12/842,001; Mailed Nov. 6, 2013; 7 Pages.
Notice of Allowance issued in U.S. Appl. No. 12/842,001; Mailed Feb. 28, 2014; 5 Pages.
Non-Final Office Action issued in U.S. Appl. No. 13/253,887; Mailed Mar. 27, 2013; 14 Pages.
Notice of Allowance issued in U.S. Appl. No. 13/253,887; Mailed Sep. 16, 2013; 6 Pages.
Notice of Allowance issued in U.S. Appl. No. 13/253,887; Mailed Nov. 8, 2013; 7 Pages.
Notice of Allowance issued in U.S. Appl. No. 13/253,887; Mailed Mar. 10, 2014; 5 Pages.

* cited by examiner

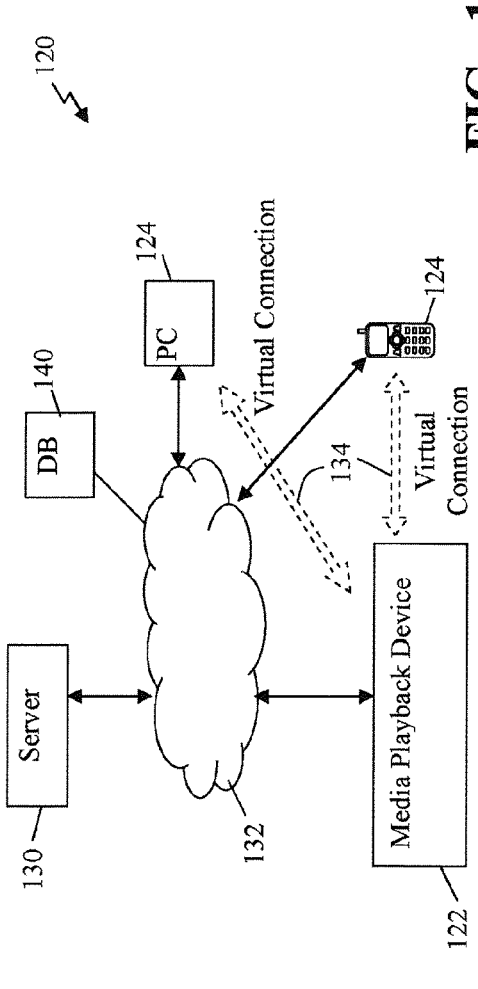
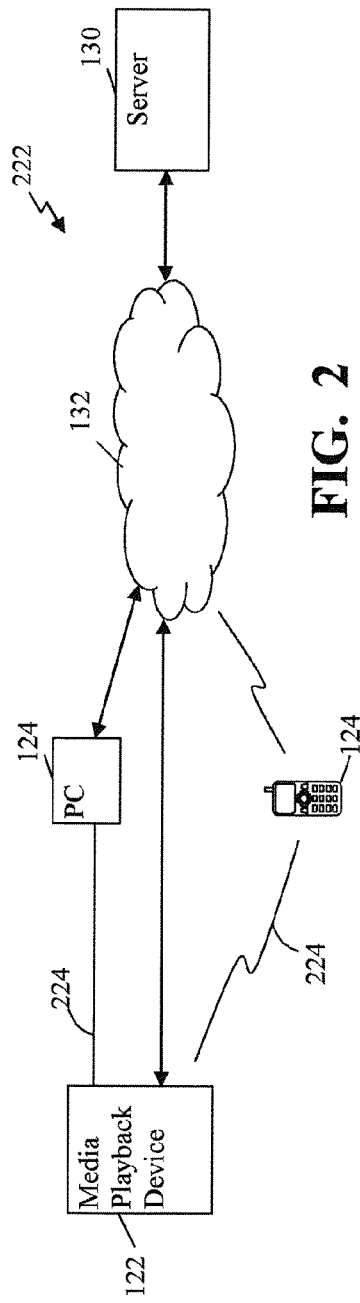

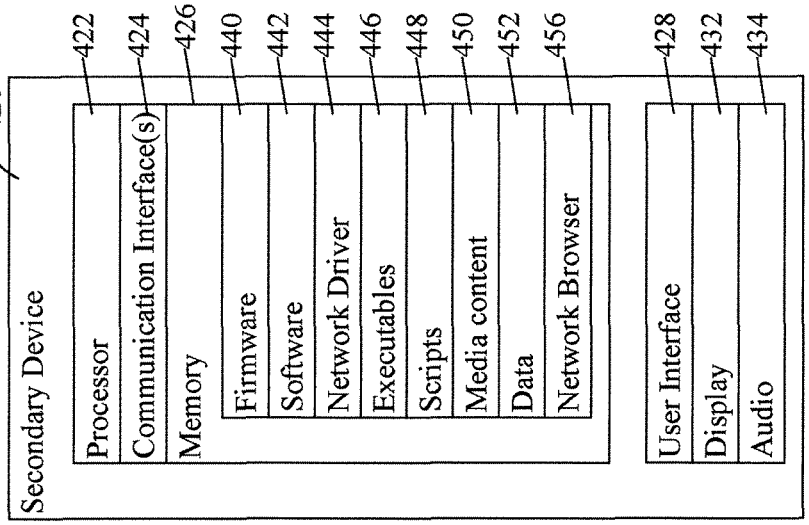
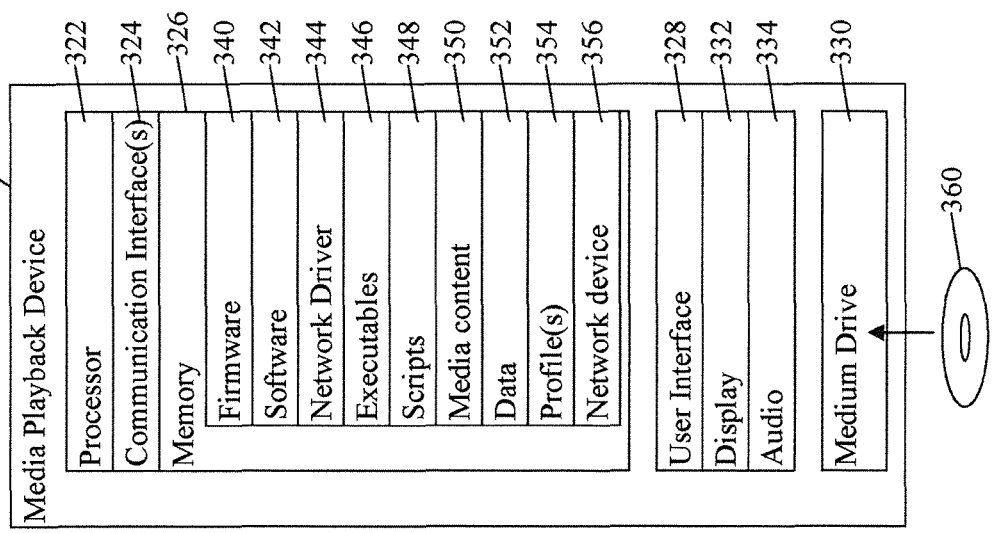

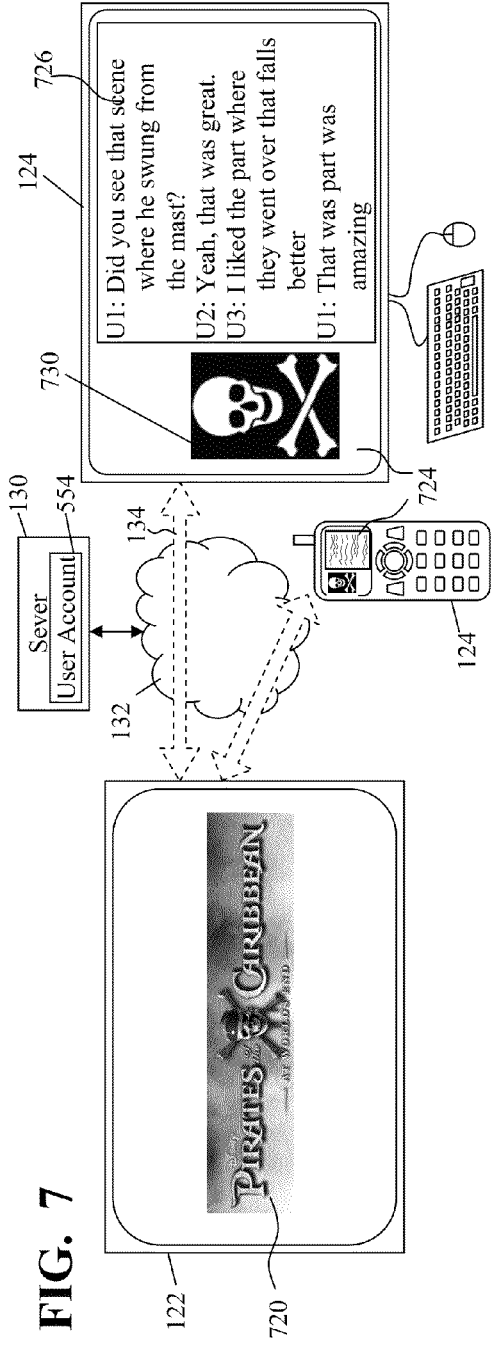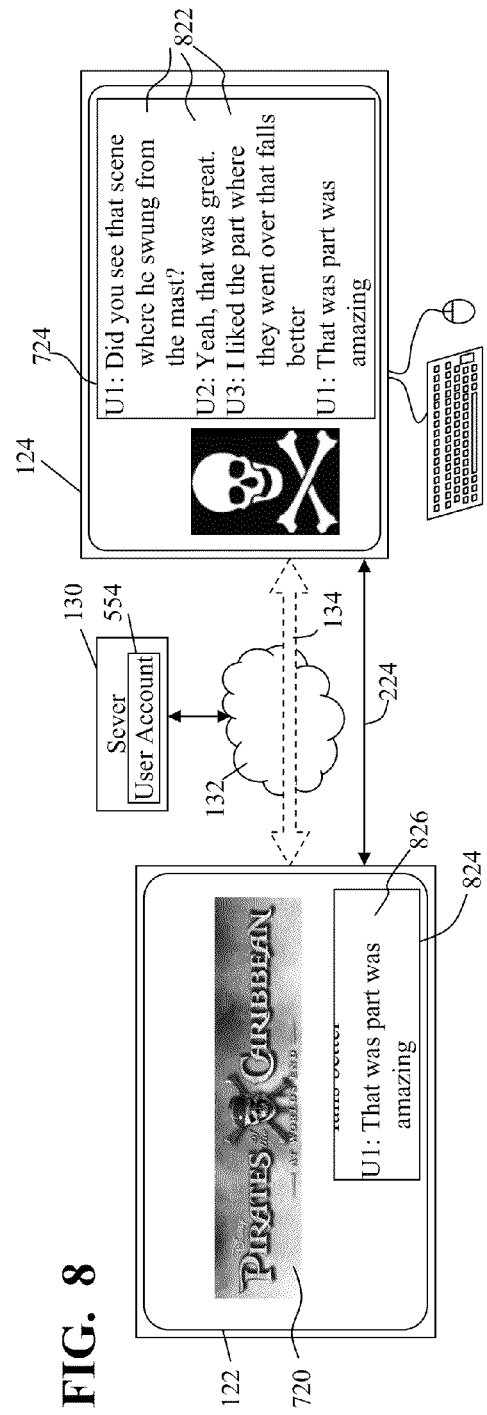

METHOD AND SYSTEM FOR USE IN COORDINATING MULTIMEDIA DEVICES

PRIORITY CLAIM

This application is a continuation of U.S. application Ser. No. 13/253,887, filed Oct. 5, 2011, by Collart et al., entitled METHOD AND SYSTEM FOR USE IN COORDINATING MULTIMEDIA DEVICES, which is a continuation of U.S. application Ser. No. 12/332,238, filed Dec. 10, 2008, by Collart et al., entitled METHOD AND SYSTEM FOR USE IN COORDINATING MULTIMEDIA DEVICES, which claims the benefit of U.S. Provisional Application No. 61/012,753, filed Dec. 10, 2007, by Collart et al., entitled METHOD AND SYSTEM FOR USE IN COORDINATING MULTIMEDIA DEVICES, all of which are incorporated herein by reference in their entirety.

FIELD OF THE INVENTION

The present invention relates generally to playback devices, and more particularly to coordinating the operation of a playback device.

BACKGROUND

Over the last several decades the distribution of content, such as multimedia content, images, video, music and other such content, has increased tremendously. There are a number of different formats for distributing content as well as a number of different mediums upon which content can be stored. Over the last few decades digital recordings of content has become the preferred mode of storing content according to some applications.

Access to and distribution of content has additionally become relatively easy and quick. As such, users are capable of accessing large amounts of digital data from locally stored content or remotely stored content.

SUMMARY OF THE EMBODIMENTS

The present embodiments advantageously provide for methods, apparatuses, and systems for use in accessing content. Some embodiments provide methods for use in playing back content. These methods access a content package comprising media content to be locally played back; detect, as defined by the content package, whether a remote secondary device is available with which a connection can be established; determine, when it is determined that remote secondary device is available, whether an authorization to establish the connection has been confirmed; establish, when it is determined that the authorization to establish the connection has been confirmed, a communication connection; determine, as instructed by the content package and when the communication with the secondary device is established, whether one or more commands are received from the secondary device; and implement, as instructed by the content package and when it is determined that the one or more commands are received from the secondary device, the one or more commands in controlling playback experience of the media content.

In some implementations, these methods may additionally or alternatively, identify, as instructed by the content package and when the communication connection is established, supplemental content to be forwarded to the secondary device; and transfer, as instructed by the content package and when there is supplemental content to be forwarded to the secondary device, the supplemental content over the established communication connection; the identifying the supplemental content can comprise identifying supplemental content within the content package that is to be played back by the secondary device; the identifying the supplemental content comprise identifying supplemental content that is exclusively to be played back by the secondary device and that is not to be played back locally; and/or the identifying the supplemental content comprises identifying supplemental content that cannot be played back locally.

Some embodiments further identify, as instructed by the content package, additional content; displaying from the content package a first text entry field; communicate, as instructed by the content package, to a secondary device a digital user interface comprising a second text entry field that corresponds with the first text entry field; wherein the receiving the one or more commands comprises receiving a communication from the remote secondary device; extract textual content from the communication that is associated with the second text entry field; and display the textual content within the first text entry field while displaying the first text entry field of the content package. In some instances, determining whether the authorization to establish the connection has been confirmed comprises: determining, as dictated by the content package, whether external devices are accessible and with which connections can be established; detecting a communication from the secondary device; determining whether the secondary device is authorized to establish the communication connection; and implementing, when the secondary device is authorized to establish the communication connection, the establishing the communication connection. Similarly, the determining whether the authorization to establish the connection has been confirmed comprises: requesting, from the secondary device, an authorization code; determining whether the authorization code corresponds with a locally stored authorization; and implementing, when the authorization code corresponds with the locally stored authorization, the establishing the communication connection. Further, the determining whether the authorization to establish the connection has been confirmed comprises: accessing, as instructed by the content package, a remote server; requesting, from the remote server, an authorization to establish the communication connection with the secondary device; implementing, when the authorization is received from the remote server, the establishing the communication connection. Still further, some embodiments additionally initiate, as instructed by code within the content package, a connection with the secondary device; determine, as controlled by the code of the content package, whether an authorization is defined to established a connection with the second device; and implement the determining the device type of the remote secondary device when the authorization is defined.

Other embodiments provide content packages. These content packages comprise: media content; network access authorization; and authorization to transfer one or more portions of the media content over a distributed network. The content packages may further comprise: code, to be implemented through a media playback device that locally and directly is accessing the content package, that configures the media playback device to determine whether a virtual connection, established over the distributed network and through a single user account maintained at a remote server, is implemented between the media playback device and a remote first secondary device; determine, when the virtual connection is implemented, whether the remote first secondary device is available to playback a first portion of the media content; and forward the first portion of the media content when the first secondary device is available to playback the first portion of the media content. The code can further configure the media playback device to playback a second portion of the media content when the first secondary device is not available to playback the first portion of the media content. Additionally, the code further configures the media playback device to playback a second portion of the media content instead of playing back the first portion of the media content when the first secondary device is not available to playback the first portion of the media content. In some instances the content package further comprises: an electronic data file that when transferred into a media playback device causes the media playback device to operate in accordance with a process for use in playing back the media content, the process comprising: accessing a remote source over a network as defined by the network access authorization; verifying, through the remote source, an authorization to establish a communication connection with a first secondary device; and communicating a first portion of the media content to the remote source to be forwarded to the first secondary device when the first secondary device is verified as authorized. The process can further comprise: playing back a second portion of the media content at the playback device instead of playing back the first portion of the media content when the first secondary device is not authorized; and in some instances the process further comprises: receiving a command from the first secondary device through the remote source when the first secondary device is authorized and implementing the command.

Still other embodiments provide methods for use in playing back content. Some of these methods receive a first request, from a media playback device as initiated by a content package being accessed by the media playback device, to establish a connection with a secondary device; detect the availability of the second device distinct from the media playback device, establish the user account; identify the content package at the media playback device, where the content package comprises media content to be played back through the media playback device; determine whether an authorization is established between the primary device and the secondary device; establish, when it is determined that the authorization is established between the primary device and the secondary device, a communication connection between the media playback device and the secondary device; determine, when it is determined that the communication connection can be established between the media playback device and the secondary device and in accordance with the content package whether commands are received from the secondary device; and forward, when commands are received and the communication connection is established, the commands to the media playback device to be implemented as dictated by the content package through the media playback device. The determining whether an authorization is established between the primary device and the secondary device comprises: receiving a first request from the media playback device, to log into a user account of a plurality of user accounts; receiving a second request from the secondary device distinct from the media playback device, to log into the user account; identifying a first supplemental content associated with the content package; determining, through the user account, whether the first supplemental content is to be forwarded to the second device; and forwarding the first supplemental content to the second device when the user account authorizes the first supplemental content to be forwarded to the second device. Further, the identifying the first supplemental content can comprise receiving, from the media playback device, the first supplemental content extracted from the content package. Some embodiments further comprise: receiving a first communication from the secondary device, the first communication comprising a first string of textual content originally generated from the secondary device; forwarding the first string of textual content to the media playback device to be displayed, as dictated by the content package, through the media playback device while playing back the media content; receiving a second communication from the secondary device, the second communication comprising a second string of textual content originally generated from an alternative device communicating with the secondary source; and forwarding the second string of textual content to the media playback device to be displayed, as dictated by the content package, through the media playback device while playing back the media content.

Additionally embodiments provide methods of playing back content. Some of these embodiments receive a first request, from a media playback device, to log into a user account of a plurality of user accounts; receive a second request, from a second device distinct from the media playback device, to log into the user account; identify media content at the media playback device to be played back through the media playback device; identify a first supplemental content associated with the identified media content; determine, through the user account, whether the first supplemental content is to be forwarded to the second device; and forward the first supplemental content to the second device when the user account authorizes the first supplemental content to be forwarded to the second device. These embodiments may further establish a virtual connection between the media playback device and the second device through the user account such that communications are exchanged over the virtual connection between the media playback device and the second device; and/or designate the media playback device and the second device as a single consumer entity.

In some instances, the determination, through the user account, of whether the first supplemental content is to be forwarded to the second device comprises: identifying a user authorization level defined in the user account; identifying a plurality of supplemental content; evaluating content authorization parameters of each of the plurality supplemental content; and identifying the first supplemental content that has an authorization parameter that satisfies the authorization level of the user account. Additionally or alternatively, the identifying the first supplemental content comprises receiving, from the media playback device, the first supplemental content extracted from the media content. Still further, some embodiments implement a displaying of the first supplemental content through the media playback device when the user account does not authorize the first supplemental content to be forwarded to the second device; and/or forward the first supplemental content to the media playback device to be played back through the media playback device when the user account does not authorize the first supplemental content to be forwarded to the second device. Further in some embodiments. The first supplemental content can comprise a digital user interface to be displayed through the second device; and the method further receives textual content entered through the user interface rendered at the second device, and forwarding the textual content to the media playback device to be displayed through the media playback device. These methods can further evaluate the textual content; retrieve additional supplemental content based on the evaluation of the textual content; forward the additional supplemental content to the second device; and not forward an alternative supplemental content to the second device based on the evaluation of the textual content. Additionally, some implementations receive additional supplemental content from the second device; and forward the additional supplemental content to the media playback device to be played back through the media playback device; and some embodiments detect a firmware version on a first firmware operated through the media playback device in playing back the media content; notify the secondary device of the firmware version; receive new firmware from the secondary device; forward the new firmware to the playback device; and forward a command to replace the first firmware with the new firmware. Still further, some embodiments verify the authenticity of the media content at the media playback device; and prevent the first supplemental content from being forwarded to the second device when the media content is not authenticated; and in some instances the first supplemental content comprises a link to a remote source that provides additional content to the second device. Additionally or alternatively, some methods receive additional content from the second device generated through functionality available through the second device that is not available through the media playback device; and forward the additional content in accordance with the user account to the media playback device.

Some embodiments further provide methods for use in playing back content that perform the steps comprising: receiving a first request, from media playback device to establish a virtual connection with a second device; determining whether the second devices is accessible; determining, when the second devices is accessible, whether access to the second device is authorized; receiving a command issued from the second device; identifying that the command from the second device is to be forwarded to the media playback device such that the command is to be implemented by the media playback device affecting playback of media content being played back through the media playback device; confirming that the second device is cooperated, according to the authorization, with the media playback device; and forwarding the command to the media playback device when the second device is cooperated with the media playback device. These methods may further determining whether the media playback device is configured to accurately interpret the command; identifying, when it is determined that the command cannot be accurately interpreted by the media playback device, a corresponding command to the command, where the corresponding command can be accurately interpreted by the media playback device; and the forwarding the command comprises forwarding the corresponding command instead of the command.

Other embodiments provide method for use in playing back content that perform the steps comprising: receiving a first request, from a media playback device, to log into a user account of a plurality of user accounts; receiving, from a second device distinct from the media playback device, a second request to log into the user account; identifying media content at the media playback device to be played back through the media playback device; receiving supplemental content from the second device; determining through the user account whether the supplemental content is to be forwarded to the media playback device; and forwarding the supplemental content to the media playback device when the user account authorizes the supplemental content to be forwarded to the media playback device. The supplemental content can be textual entries of an active communication between the secondary device and a third party device such that the media playback device causes at least a portion of the textual entries to be displayed.

Still further embodiments providing methods for use in playing back content receive a first request, from media playback device to establish a virtual connection with a second device, where the playback device has an exclusive functionality of playing back multimedia content; identify a first playback firmware version of the playback device; determine whether the second devices is accessible; determine, when the second devices is accessible, whether access to the second device is authorized; notify, when access to the second device is authorized, the second device of the first playback firmware version of the media playback device; receive new firmware from the secondary device; forward the new firmware to the playback device; and forward a command to the playback device to replace the first firmware with the new firmware. These embodiments may further identify a content package comprising media content at the media playback device where the media content is to be played back through the media playback device; identify supplemental content associated with the identified content package; determine, in accordance with the authorization, whether the supplemental content is to be forwarded to the second device; and forward the supplemental content to the second device when the authorization authorizes the supplemental content to be forwarded to the second device. They may further receive a firmware error indicated that an option available through a media content package to be played back through the playback device is not supported by the first playback firmware version; identify an updated firmware version for the playback device that implements the option; and notify the second device of the updated firmware version needed to implement the option on the playback device.

Some embodiments perform the steps comprising: receiving a first request from a media playback device to log into a user account of a plurality of user accounts; receiving a second request from second device distinct from the media playback device to log into the user account; notifying the second device that the media playback device is logged into the user account; identifying command functions available in controlling the media playback device; determining through the user account whether the command functions are to be forwarded to the second device; and forwarding the command functions to the second device when the user account authorizes the command functions to be forwarded to the second device. The command functions can comprise command functions that cannot be implemented through the media playback device. The identifying command functions can comprises transmitting a request to the media playback device to identify the command functions defined within media content at the media playback device where the media content is configured to be played back through the media playback device.

The methods may further perform the steps comprising: identifying media content at the media playback device to be played back through the media playback device; and the identifying command functions comprises identifying command functions associated with the media content that are available in controlling the media playback device. Additionally or alternatively, the methods may determine whether the second device is configured to render supplemental content; communicate the supplemental content to the media playback device to be rendered through the media playback device when the second device is not configured to render the supplemental content; and communicate the supplemental content to the second device and not communicating the supplemental content to the media playback device when the second device is configured to render the supplemental content. Still further steps may be performed comprising receiving a trigger detection from the media playback device detecting a trigger event during the playback of the media content; and communicating a trigger activation to the second device configured to dictate a playback, at the second device, of a corresponding portion of the supplemental content that corresponds with the trigger event. Some implementations additionally receive a communication from a remote user not logged into the user account, the communication comprising a destination user identifier and an additional command configured to provide control over the media playback device; determine whether the destination user identifier corresponds with the user account; and forward the additional command to the second device when the destination user identifier corresponds to the user account. Still other embodiments receive a communication from a remote user not logged into the user account, the communication comprising an additional command configured to provide control over the media playback device; determine whether the user account is identified in a buddy list associated with the remote user; and forward the additional command to the second device when the user account is identified in the buddy list associated with the remote user. In some instances the communication further comprises supplemental content, and the above embodiments may forward the supplemental content to the media playback device when the user account is identified in the buddy list associated with the remote user. The above embodiments may further receive a communication from a remote user not logged into the user account, the communication comprising supplemental content; determine whether the user account is identified in a buddy list associated with the remote user; and forward the supplemental content to the media playback device when the user account is identified in the buddy list associated with the remote user.

Still further embodiments perform the steps comprising: accessing a content package comprising media content to be locally played back; detecting a communication from a remote secondary device; determining a device type of the remote secondary device; searching the content package and identifying command options defined within the content package that are configured to be implemented through the device type of the remote secondary device and that dictate control of local playback of at least a portion of the media content; communicating one or more of the command options to the remote secondary device; and receiving a selection of one of the command options from the remote secondary device and implementing control of the playback of the at least the portion of the media content in accordance with the received selected one of the command options. The further steps comprising: accessing, over a distributed network, a remote server; and logging in to a user account managed by the remote server, may be performed wherein the detecting the communication from the remote secondary device comprises receiving, through the user account and from the remote server, the communication from the remote secondary device, where the remote secondary device is also logged in to the user account. Additionally or alternatively, the searching the content package and the identifying the command options can comprises identifying a first subset of command options that are configured to be implemented through a remote control and identifying a second set of command options that cannot be implemented through the remote control; and the communicating the one or more of the command options to the remote secondary device can comprises communicating one or more of the second set of command options to the remote secondary device. Still further steps comprise receiving textual content from the remote secondary device; and displaying the textual content with the at least the portion of the media content; and/or determining whether the remote secondary device is configured to render supplemental content; rendering locally the supplemental content with the at least the portion of the content when the remote secondary device is not configured to render the supplemental content; and communicating the supplemental content to the remote secondary device and not locally rendering the supplemental content when the remote secondary device is configured to render the supplemental content. The above methods may further detect a trigger event from the at least the portions of the media content during the playback of the at least the portion of the media content; and communicate a trigger activation to the remote secondary device configured to dictate a playback of a corresponding portion of the supplemental content that corresponds with the trigger event.

Other embodiments perform the steps comprising: accessing a locally stored digital content package comprising media content; playing back at least a portion of the media content of the content package; displaying from the content package a first text entry field; communicating to a remote secondary device a digital user interface comprising a second text entry field that corresponds with the first text entry field; receiving a communication from the remote secondary device; extracting textual content from the communication that is associated with the second text entry field; and displaying the textual content within the first text entry field while displaying the first text entry field of the content package. An additional step of retrieving the digital user interface from the content package can also be performed. These embodiments may further implement the steps comprising: identifying supplemental content in the content package; communicating the supplemental content to the remote secondary device; detecting a trigger event in the media content during the playback of the media content; communicating a trigger activation to the remote secondary device configured to dictate a playback of a corresponding portion of the supplemental content that corresponds with the trigger event. Additionally or alternatively, steps comprising: evaluating the textual content and identifying a designation within the textual content; identifying a first subsequent portion of the content package as a function of the identified designation; and displaying the first subsequent portion of the content package based on the identified designation and not displaying a second subsequent portion of the content package based on the identified designation, may be performed; and in some instance evaluating the textual content and identifying a designation within the textual content; identifying a first portion of the content package as a function of the identified designation; and communicating the first portion of the content package to the remote secondary device configured to be displayed by the secondary device and not communicating a second portion of the content package to the remote secondary device as a function of the identified designation, may also be performed.

Further embodiments provide methods for use in controlling the playing back of content. These methods perform the steps comprising: playing back, through a media playback device, media content from a locally stored media package directly accessed by the media playback device; receiving a first communication from a remote secondary source, the first communication comprising a first string of textual content originally generated from the secondary source; displaying the first string of textual content with the media content while playing back the media content; receiving a second communication from the remote secondary source, the second communication comprising a second string of textual content originally generated from an alternative source communicating with the secondary source through the distributed network; and displaying the second string of textual content with the media content while playing back the media content; and in some instances may determining, and instructed by the media package, whether communication is authorized with the remote secondary device; and establishing, as instructed by the media package, a connection with the remote secondary device when it is determined that the secondary device is available; where in some instances the determining whether communication is authorized with the remote secondary device comprises receiving an authorization code from the secondary device and determining, as instructed by the content package, whether the authorization code is authorized. Additionally or alternatively, the methods may further perform the steps comprising: accessing a remote server over the distributed network; logging into a first user account of a plurality of user accounts maintained through the remote server; determining whether the remote secondary device is logged into the first user account of the plurality of user accounts; and accepting the first and second communications when the secondary device is logged into the first user account and not accepting the first and second communications when the secondary device is not logged into the first user account. Further, the embodiments may perform the steps comprising: accessing a remote server over the distributed network; logging into a first user account of a plurality of user accounts maintained through the remote server; and where the receiving the first communication and the second communication comprise receiving the first communication and the second communication through the remote server when the second device is similarly logged into the user account. Additionally or alternatively, the steps comprising: determining whether the first user account authorizes the acceptance of communications from the second device; and accepting the first and second communications when the first user account authorizes the media device to accept communications from the second device and not accepting the first and second communications when the first user account does not authorizes the media device to accept communications from the second device, may be performed; while in some instances the receiving the first communication comprises receiving the first communication from the remote secondary source participating in a chat session over the distributed network related to the media content, the first communication comprising the first string of textual content originally generated from the secondary source as part of the communication in the chat session.

Additional embodiments comprise content packages, and these content packages can comprise: media content; network access authorization; and authorization to transfer one or more portions of the media content over a distributed network. The content packages can further comprise code, to be implemented through a media playback device that locally and directly is accessing the content package, that configures the media playback device to determine whether a virtual connection, established over a distributed network and through a single user account maintained at a remote server, is implemented between the media playback device and a remote first secondary device; determine, when the virtual connection is implemented, whether the remote first secondary device is available to playback a first portion of the media content; and forward the first portion of the media content when the first secondary device is available to playback the first portion of the media content; while in some instances the code further configures the media playback device to playback a second portion of the media content when the first secondary device is not available to playback the first portion of the media content; and while additionally or alternatively the code further configures the media playback device to playback a second portion of the media content instead of playing back the first portion of the media content when the first secondary device is not available to playback the first portion of the media content. In some instances the content package comprises an electronic data file that when transferred into a media playback device causes the media playback device to operate in accordance with a process for use in playing back the media content, the process comprising: accessing a remote source over a network as defined by the network access authorization; verifying, through the remote source, an authorization to establish a communication connection with a first secondary device; communicating a first portion of the media content to the remote source to be forwarded to the first secondary device when the first secondary device is verified as authorized; while in some instances, the process further comprises: playing back a second portion of the media content at the playback device instead of playing back the first portion of the media content when the first secondary device is not authorized; and further in some embodiments the process further comprises: receiving a command from the first secondary device through the remote source when the first secondary device is authorized and implementing the command; and/or the command is a command that can not be implemented through a remote control device in direct communication, in a distance of less than about 20 feet, with the playback device.

Further embodiments provide method for use in coordinating operation of a playback device, where the methods perform the steps comprising: maintaining a plurality of user accounts; receiving a request to access a first user account of the plurality of user accounts through a media playback device; identifying media content cooperated with the media playback device to be played back through the media playback device; receiving from a second device a request to access the first user account; establishing a virtual cooperation as a function of the user account between the media playback device and the second device; identifying additional content relevant to the media content to be played back through the media playback device; communicating the additional content to the second device to be rendered by the second device; determining functionality that the second device is configured to implement that is associated with the operation of the media playback device; receiving communications from the second device; extracting commands from the communication; and forwarding the commands to the media playback device to be implemented by the media playback device.

Still further embodiment provide methods for use in playing back content that perform the steps comprising: receiving a first request, from a media playback device, to establish a connection with a secondary device; detecting the availability of the second device distinct from the media playback device, establish the user account; identifying media content at the media playback device to be played back through the media playback device; identifying a first supplemental content associated with the identified media content; determining whether an authorization is established between the primary device and the secondary device, determining, when it is determined that the authorization is established between the primary device and the secondary device, whether a connection can be established between the media playback device and the secondary device; and determining, when it is determined that the connection can be established between the media playback device and the secondary device.

Additionally embodiments provide methods for use in playing back content, the methods performing the steps comprising: accessing a content package comprising media content to be locally played back; detecting, as defined by the content package, whether a remote secondary device is available with which a connection can be established; determining, when it is determined that remote secondary device is available, whether an authorization to establish the connection has been confirmed; establishing, when it is determined that the authorization to establish the connection has been confirmed, a communication connection; identifying, when the communication connection is established, as defined with the content package supplemental content to be forwarded to the secondary device; and transferring, over the established communication connection, the supplemental content; while in some instances the determining whether the authorization to establish the connection has been confirmed comprises: determining, as dictated by the content package, whether external devices are accessible and with which connections can be established; detecting a communication from the secondary device; determining whether the secondary device is authorized to establish the communication connection; and implementing, when the secondary device is authorized to establish the communication connection, the establishing the communication connection; and in some instances the determining whether the authorization to establish the connection has been confirmed comprises: requesting, from the secondary device, an authorization code; determining whether the authorization code corresponds with a locally stored authorization; and implementing, when the authorization code corresponds with the locally stored authorization, the establishing the communication connection. In some instances the determining whether the authorization to establish the connection has been confirmed comprises: accessing, as instructed by the content package, a remote server; requesting, from the remote server, an authorization to establish the communication connection with the secondary device; implementing, when the authorization is received from the remote server, the establishing the communication connection. These methods may further perform the steps comprising: initiating, as instructed by code within the content package, a connection with the secondary device; determining, as controlled by the code of the content package, whether an authorization is received from the secondary device; and implementing the determining the device type of the remote secondary device when the authorization is received from the secondary device. Additionally or alternatively, the embodiments may perform the steps comprising initiating, as instructed by code within the content package, a connection with the secondary device; determining, as controlled by the code of the content package, whether an authorization is defined to established a connection with the second device; and implementing the determining the device type of the remote secondary device when the authorization is defined.

Still further embodiments provide methods for use in playing back content, these methods perform the steps comprising: accessing a locally stored digital content package comprising media content; playing back at least a portion of the media content of the content package; determining, as instructed by the content package, whether a remote secondary device is available with which a communication connection could be established; establishing, as instructed by the content package, the communication with the secondary device when it is determined that the secondary device is available; determining, as instructed by the content package and when the communication with the secondary device is established, whether additional content is received from the secondary device; and playing back, as instructed by the content package and when it is determined that the additional content is received from the secondary device, the additional content; and may further perform the steps comprising: identifying, as instructed by the content package and when the communication connection is established, supplemental content to be forwarded to the secondary device; and transferring, as instructed by the content package and when there is supplemental content to be forwarded to the secondary device, the supplemental content over the established communication connection; where in some instances the identifying the supplemental content comprises identifying supplemental content within the content package that is to be played back by the secondary device; and/or the identifying the supplemental content comprises identifying supplemental content that is exclusively to be played back by the secondary device and that is not to be played back locally. In some embodiments, the identifying the supplemental content comprises identifying supplemental content that cannot be played back locally. The above embodiments may additionally or alternatively perform the steps comprising: identifying, as instructed by the content package, additional content; displaying from the content package a first text entry field; communicating, as instructed by the content package, to a secondary device a digital user interface comprising a second text entry field that corresponds with the first text entry field; receiving a communication from the remote secondary device; extracting textual content from the communication that is associated with the second text entry field; and displaying the textual content within the first text entry field while displaying the first text entry field of the content package.

Some embodiments provide methods for use in playing back content. These methods receive a first request from media playback device to log into a user account of a plurality of user accounts; receive a second request to log into the user account from a secondary device distinct from the media playback device; identify media content at the media playback device to be played back through the media playback device; identify supplemental content associated with the identified media content; determine through the user account whether the supplemental content is to be forwarded to the secondary device; and forward the supplemental content to the secondary device when the user account authorizes the supplemental content to be forwarded to the secondary device.

Some embodiments provide methods for use in playing back content. These methods comprise: receiving a first request from media playback device to log into a user account of a plurality of user accounts; receiving a second request to log into the user account from a secondary device distinct from the media playback device; identifying media content at the media playback device to be played back through the media playback device; receiving supplemental content from the secondary device; determining through the user account whether the supplemental content is to be forwarded to the media playback device; and forwarding the supplemental content to the media playback device when the user account authorizes the supplemental content to be forwarded to the media playback device.

Still other embodiments provide method for use in playing back content, comprising: receiving a first request from media playback device to log into a user account of a plurality of user accounts, where the playback device has an exclusive functionality of playing back multimedia content; identifying a first playback firmware version of the playback device; receiving a second request to log into the user account from a secondary device distinct from the media playback device; notifying the secondary device of the first playback firmware version of the media playback device that is logged into the user account; receiving new firmware from the secondary device; forwarding the new firmware to the playback device; and forwarding a command to the playback device to replace the first firmware with the new firmware.

Still further embodiments provide methods for use in playing back content. These methods receive a first request from a media playback device to log into a user account of a plurality of user accounts; receive a second request from secondary device distinct from the media playback device to log into the user account; notify the secondary device that the media playback device is logged into the user account; identify command functions available in controlling the media playback device; determine through the user account whether the command functions are to be forwarded to the secondary device; and forward the command functions to the secondary device when the user account authorizes the command functions to be forwarded to the secondary device.

Some embodiments provide methods for use in playing back content that comprise: accessing content package comprising media content to be locally played back; detecting a communication from a remote secondary device; determining a device type of the remote secondary device; searching the content package and identifying command options defined within the content package that are configured to be implemented through the device type of the remote secondary device and that dictate control of local playback of at least a portion of the media content; communicating one or more of the command options to the remote secondary device; receiving a selection of one of the command options from the remote secondary device and implementing control of the playback of the at least the portion of the media content in accordance with the received selected one of the command options.

Additional embodiments provide methods for use in playing back content. These methods comprise: accessing a locally stored digital content package comprising media content; playing back the media content of the content package; displaying from the content package a first text entry field; communicating to a remote secondary device a digital user interface comprising a second text entry field that corresponds with the first text entry field; receiving a communication from the remote secondary device; extracting textual content from the communication that is associated with the second text entry field; and displaying the textual content within the first text entry field while displaying the first text entry field of the content package.

Other embodiments provide methods for use in controlling the playing back of content that comprise: playing back media content from a locally stored media package; receiving a first communication from a remote secondary source, the first communication comprising a first string of textual content originally generated from the secondary source; displaying the first string of textual content with the media content while playing back the media content; receiving a second communication from the remote secondary source, the second communication comprising a second string of textual content originally generated from an alternative source communicating with the secondary source through a distributed network; and displaying the second string of textual content with the media content while playing back the media content.

Some embodiments provide for content packages. These packages comprise; media content; network access authorization; and authorization to transfer one or more portions of the media content over a distributed network.

Other embodiments provide for systems for use in coordinating operation of a playback device. These systems comprise: maintaining a plurality of user accounts; receiving a request to access a first user account of the plurality of user accounts through a media playback device; identifying media content cooperated with the playback device to be played back through the playback device; receiving from a secondary device a request to access the first user account; establishing a virtual cooperation as a function of the user account between the playback device and the secondary device; identifying additional content relevant to the media content to be played back through the playback device; communicating the additional content to the secondary device to be rendered by the secondary device; determining functionality that the secondary device is configured to implement that is associated with the operation of the playback device; receiving communications from the secondary device; extracting commands from the communication; and forwarding the commands to the playback device to be implemented by the playback device.

Still further embodiments provide methods for use in playing back content, that perform the step comprising: receiving a first request, from media playback device, to log into a user account of a plurality of user accounts; receiving, from a second device distinct from the media playback device, a second request to log into the user account; receiving a command issued from the second device; identifying that the command from the second device is to be forwarded to the media playback device such that the command is to be implemented by the media playback device affecting playback of media content being played back through the media playback device; confirming that the second device is cooperated, according to the user account, with the media playback device; and forwarding the command to the media playback device when the second device is cooperated, through the user account, with the media playback device.

Other embodiments perform steps comprising: receiving a first request from a media playback device to log into a user account of a plurality of user accounts, where the playback device has an exclusive functionality of playing back multimedia content; identifying a first playback firmware version of the playback device; receiving a second request to log into the user account from a second device distinct from the media playback device; notifying the second device of the first playback firmware version of the media playback device that is logged into the user account; receiving new firmware from the secondary device; forwarding the new firmware to the playback device; and forwarding a command to the playback device to replace the first firmware with the new firmware.

Further embodiments provide methods for use in controlling the playing back of content. These methods perform the steps comprising: playing back, through a media playback device, media content from a locally stored media package directly accessed by the media playback device; receiving, over a virtual connection established over a distributed network and through a single user account maintained at a remote server, a first communication from a remote secondary source, the first communication comprising a first string of textual content originally generated from the secondary source; displaying the first string of textual content with the media content while playing back the media content; receiving, over the virtual connection, a second communication from the remote secondary source, the second communication comprising a second string of textual content originally generated from an alternative source communicating with the secondary source through the distributed network; and displaying the second string of textual content with the media content while playing back the media content.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein:

FIG. 1 depicts a simplified block diagram of a system according to some embodiments where media devices are coordinated FIG. 2 depicts simplified block diagram of a system according to some embodiments to provide coordination between media devices;

FIG. 3 depicts a simplified block diagram of a media playback device that can be implemented in the systems of FIGS. 1 and 2 as the first or primary device;

FIG. 4 shows a simplified block diagram of an example secondary media device that can be utilized in the systems of FIGS. 1 and 2 in coordinating with a primary device;

FIG. 7 depicts a simplified representation of the virtual connection or link established between a primary device and a secondary device of FIGS. 1 and 2 in accordance with some embodiments, and a representative cooperation between the primary and secondary devices through the virtual link;

FIG. 8 depicts a simplified representation of the virtual connection, similar to that of FIG. 7, established between a primary device and a secondary device in accordance with some embodiments with a representative cooperation between the primary and secondary devices through the virtual connection;

Figure 6:
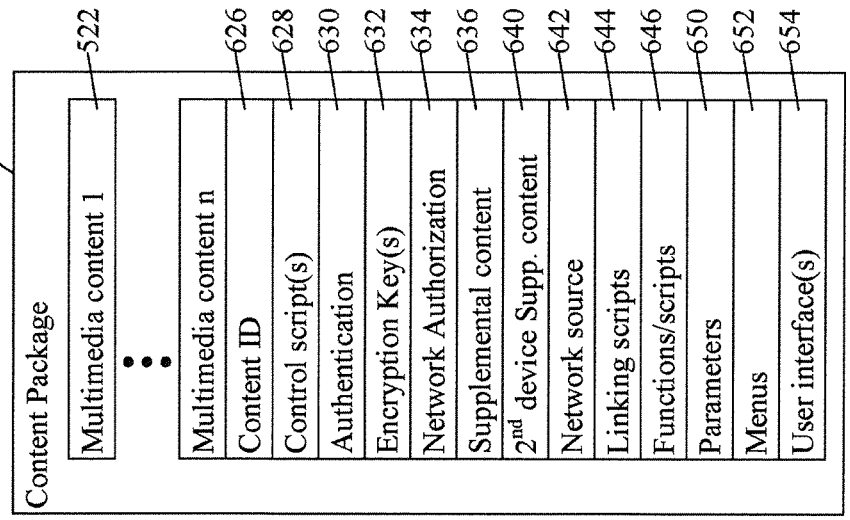
FIG. 6 shows a simplified representation of a content package according to some implementations that can be utilized by, for example, a primary device of FIGS. 1 and 2.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide methods and systems for use in providing access to content and coordinating media devices. For example, a secondary media device can be coordinated with a primary media device so that content accessed or inputted through the secondary device is relevant to and/or associated with content accessed or played back through the primary device. The coordination, in part, allows a user to take advantage of the benefits and functionalities provided through the secondary device that are not available through the primary device, while maintaining a coordination between the primary and secondary devices. For example, televisions (TV) typically do not include a keyboard, and supplying alphanumeric characters to the TV can be difficult (e.g., using a remote control with limited buttons, using a virtual keyboard through a remote control, or other such non-user friendly interfaces). Alternatively, a computer typically has a keyboard that allows a user to quickly and accurately type out alphanumeric characters. In some implementations, the present embodiments coordinate the TV with a computer so that the user can take advantage of at least the keyboard of the computer to enter alphanumeric characters that can be forwarded for, at least, display on the TV (and/or to other multimedia devices and/or users as fully described below). Entries or actions performed at the secondary device provide a virtual command or control that is communicated through the coordination to be utilized by the primary device.

In some implementations the cooperation is based on a content package played back through the primary device and further is established through a user account or profile. Both primary and secondary devices can register and/or log in to a common profile or account, for example, through a distributed communication network in association with the content package. Once both devices are logged-in to the same account a cooperation can be established and maintained between the two devices. The cooperation, in some instances, is maintained while the two devices continue to be logged-in to the same profile. In some embodiments, a virtual connection or link is established allowing content and/or commands to be communicated to one or both of the devices and/or between the devices, and/or additional content associated with content being accessed at a primary device can be forwarded to the second cooperated device. For example, an action taken at the secondary device can provide a virtual event that can be provide to the primary device. Even a single key stroke, including simply typing a letter (e.g., "A") can define a virtual event that can be utilized by the primary device. Content in the secondary device can be dependent on the content package played back through the primary device and/or the portion of content being accessed from the content package. The content package provides some of the functionality for the cooperation. Further, the cooperation allows an interconnectivity and content dependent interface providing additional functionality and user input modality and capabilities that are not available through the primary device.

The content package is authored with the knowledge that a secondary device may be present such that the secondary device can cooperate with the primary device to provide added functionality, enhance playback experience, provide an interactive experience and/or a shared experience with other users. The content package in some implementations includes programming that activates the playback device to establish the cooperation and/or connection. The cooperation between devices can be established through various methods and typically employs security conditions to limit access. For example, a consumer identifier (registration for example), which can contain aspects to specify how and with what secondary devices can be cooperate can be stored locally on the playback device and/or accessed from a server. Some specific example, the content package can include on-disc content that is BD-Live aware. The playback device can then associate the disc with a server experience and therefore with the secondary device. Some implementations further use the AACS Online APIs to determine, for example, volume ID, player ID, serial ID (BCA/PMSN) and/or other such parameters and uses one or more for association, or in combination with registration information to secure the connection, and in some instances guarantee a single instance combination (one primary display).

The content package is authored with the functionality to establish, or authored to receive updates that would allow the content package to establish, one or more virtual connections and/or direct connection with one or more secondary devices. In some instances, the connections are established through a third party (e.g., an Internet service or server). Additionally or alternatively, the content package can be authored, or updated, to establish a direct connection with one or more secondary devices without requiring a third party intermediary, for example, through some shared password, device ID, key or the like. The established connection provides the ability to extend the content package experience beyond the primary device. For example, the content package can be authored to take advantage of BD Touch to allow a direct cooperation between a primary and one or more secondary devices. Further, a primary device may establish one or more direct connections with one or more secondary devices, and simultaneously establish one or more virtual connections 134 with one or more other secondary devices. Through connection established between two or more devices in accordance with the authored or updated content package, the content package experience (e.g., playback of a movie or music, playing of a game, viewing other multimedia or data) can be extended beyond the primary device.

There are many benefits to authoring content (whether physical media such as DVD, HD DVD, Blu-ray, etc., or an electronic version of the content such as content streamed over a network) with knowledge that there could be a secondary device. This allows the content in physical or electronic form to better take advantage of the secondary device, and to perform, scale and/or alter playback differently depending on with a secondary device is present. By way of example, the lack of a secondary device can cause the authored content (say a Blu-ray disc) to instruct the primary playback device to display an interactive feature over the playing multimedia content (e.g., Blu-ray movie) on the primary device. Alternatively in some instances, when a secondary device is available, the same Blu-ray disc can be authored such that the primary device detects the cooperation or linking of the secondary device and enables the same interactive feature to instead be displayed on the secondary device. As a result, the interactive feature does not take up valuable display real estate on the primary device or interfere or cover the displayed movie when undesirable. This provides more flexibility and control to the content developers and/or owners that previously did not exist.

The cooperation between the primary and secondary devices can be activated by the content package, the user operating the primary device, the user operating the secondary device (where in many instances the same user may be operating both, but different users can be cooperated once securities and/or authorizations are established). With some applications, the content package attempts to establish, or instructs the user to establish, the relationship as soon as possible in the content package (e.g., on-disc) experience, which allow the use of the functionalities provided by the secondary device sooner rather than later. In many applications, cooperation and/or registration information (such as in local storage) may have already been established and/or is quickly obtained, and can be automatically used for association with the secondary device. For example, a user can register once, and then that information is retained for future use. In establishing the cooperation the content package instructs and/or playback device also attempt to determine server connectivity/availability early in the playback experience to facilitate the cooperation and/or notify a user to establish cooperation.

As identified above, in many instances it is desirable to cooperate the primary and secondary devices early and/or as soon as possible relative to the playback experience. This cooperation can be activated by programming in the content package or the playback device, or triggered by the server or secondary device, for example, by monitoring for an availability of the secondary device and then notifying the disc playback of its availability, a generically available for any on-disc (or downloaded) BD-J application to take advantage of the secondary device (if available), and the like. Similarly, feedback back may be provided to the primary device that a secondary device is available. Once the connection is established the playback device may, in some instances, be able to take advantage of the capabilities of the secondary device, additional content can be provided to the secondary device, additional content may be received from the secondary device and the like. Additionally, the content package, upon detecting and/or establishing the cooperation between the two or more devices, can identify or be informed (e.g., from the server or the secondary device) that allows the primary display to be adapted based on the secondary device being available. The content package can provide this functionality through code within the content package or retrieved from a server, e.g., BD-Java code, has the functionality to detect the connection and take advance of the connection. As described above and further below, in some instances the content package is Blu-ray compliant, such as a Blu-ray disc, and as such utilizes and takes advantages of the functionalities provided through the Blu-ray specifications, including Blu-ray Disc specification, Multimedia Home Platform (MHP), Globally Executable MHP (GEM), Home Audio Video Interoperability (HAVi), and JavaTV, all of which are incorporated herein by reference.

As introduced above, the playback experiences with the cooperation of a secondary device can also be tailored on a user account basis. Some embodiments support multiple accounts per player (mom, dad, son, daughter) and/or users so that the experience can be adjusted depending on a viewer. Further, the accounts can be portable to different playback devices and not restricted to a single location or device. This allows users to access or log-in to their user account from other compatible players and/or locations. Some of the benefit this provides is that users can take their preferences, personalization, and the like with them from player to player.

FIG. 1 depicts a simplified block diagram of a system 120 according to some embodiments where media devices are coordinated. The system 120 comprises a first or primary device 122 and one or more secondary devices 124 that are cooperated through a remote service or server 130 through a distributed network 132. As an example, the primary device 122 can be a TV, playback device coupled with a TV, a computer, or the like, and a secondary device can be a computer, a wireless phone or other relevant devices. The primary and secondary devices can be substantially any relevant consumer electronic device capable of cooperating as described below. The server 130 communicates over the distributed network 132 with both the primary device 122 and the secondary device 124 to provide the coordination between the primary and secondary devices, where, in some instances, a virtual connection or link 134 is established between the primary device and the secondary device(s). Additionally in some instances, one or more remote data storage devices and/or databases 140 can connect with the distributed network 132 and be accessed by the primary device 122, secondary device 124, and/or server 130.

Based on the content being accessed through the primary device 122, the server 130, in some implementations, can provide relevant content to the secondary device once the primary and secondary devices 122, 124 are cooperated or linked. The relevant content can be retrieved from the primary device 122, supplied directly from the server 130, accessed from a remote storage or database 140, and/or authorized to be accessed from a third party source (not shown). Additionally or alternatively, based on content provided to and/or accessed by the secondary device 124 the server 130 can forward relevant content to the primary device 122. For example, when a movie or program is being watched through the primary device 122, the server is informed of the program or movie and can forward content relevant to the program or movie to the secondary device 124.

Similarly, the server 130 can receive content received by and/or generated at the secondary device 124 and provide some or all of the received content to the primary device 122 to be displayed and/or used in controlling the primary device. For example, the primary device can be a set-top-box configured to receive broadcast, satellite and/or cable provided content that is forwarded to be displayed on a TV, and the secondary device 124 can be a computer that the user is utilizing to participate in an online chat session, such that the server forwards the chat text from the secondary device to the primary device 122 (set-top-box) that forwards the text to be displayed on the accompanying TV. As another example, one or more virtual entries, which can include a key stroke, text, replies, commands (e.g., a skip) and/or other relevant events, can be entered by a user into the secondary device 124 that are forwarded through the server 130 to the primary device 122 where the primary device implements the received the virtual entry, e.g., command (e.g., by skipping forward in content displayed through the primary device 122). As such, the server provides accurate routing of commands, content, supplemental content and the like. In some instances, the server comprises a messaging service used in routing communications, commands, content and the like. The server, in some embodiments, can maintain a database of devices and the cooperation between devices, and can use this database in routing by maintaining source and destination information. Numerous different device pairs and/or groups of devices can be independently cooperated through the server 130, and the communications with these pairs or groups can be maintained separate by the server. It is noted that the server 130 is depicted in FIG. 1 as a single block, however, it will be appreciated that the server may be a single device or multiple devices distributed over the network 132 that would in concert distribute the workload to establish the cooperations between devices while supporting thousands to hundreds of thousands or more of cooperated pairs of devices or groups of devices at a time.

FIG. 2 depicts simplified block diagram of a system 220 according to some embodiments to provide coordination between media devices. Similar to the system 120 of FIG. 1, the system 220 includes a first or primary media device 122, one or more secondary devices 124 and a server 130 communicationally coupled with one or both the primary device 122 and the secondary device(s) 124 through a distributed network 132. In this embodiment, however, a secondary device 124 can directly communicate through direct communication links or connections 224 with the primary media device 122. These direct connection 224 can be wired, optical, wireless or other such relevant links (e.g., twisted wire pair, radio frequency (RF), infrared (IR), WiFi, Bluetooth and the like). The server 130 in part provides coordination and/or authorization to the primary device and/or the secondary device(s) so that content can be communicated, received and/or accurately utilized (e.g., decrypted) as fully described below.

FIG. 3 depicts a simplified block diagram of a media playback device 320 that can, for example, be implemented in the systems 120, 220 as the first or primary device 122. The media playback device 320 includes one or more processors or controllers 322, one or more communication interfaces 324, one or more memory or computer readable storage 326, user interface 328 and other relevant components such as internal communication links and/or buses (not shown), and the like. Some media playback devices 320 further optionally include relevant components for use in playing back content, such as medium drive 330, a display 332, audio system (e.g., one or more speakers) 334, and other relevant components.

The media playback device 320 can be substantially any relevant playback device such as, but not limited to, a set-top-box, a TV, a disk player (e.g., Blu-ray, high-definition digital versatile disc (HD-DVD), digital versatile disc (DVD), compact disc (CD), etc.), audio player, computer and the like. The processor(s) 322 can be one or more microprocessors, minicomputers or other such processing devices or combinations of devices configured to access and implement the playback of the multimedia content, and in some instances provide functional control of the system. In some embodiments the processor 322 includes video and/or audio processing functionality, such as decoders, encoders and the like; however, the video and/or audio processing functionality can be implemented through separate devices cooperated with the processor 322 such that at least some of the processing of content is initiated by the processor 322 instructing other processing devices to perform specific aspects of the content processing. Additionally, in some instances, the processor 322 includes communication functionality and/or directs additional devices to process received communications (e.g., communications from over the network 132, from a remote control device, and other such communications) as well and transmit communications. The communication interfaces 324 provide interfaces, ports, connections, antenna and the like through which the media playback device 320 can communicate with other remote devices and/or communication networks. These communication interfaces can include interfaces such as, but not limited to, a parallel port, an IEEE 1394 serial port, a game port, a USB port, an IR interface, RF interfaces, antenna or other such interfaces.

The memory 326 is coupled with the processor 322 and typically includes one or more processor and/or computer-readable media accessed by at least the processor 322 and can include volatile and/or nonvolatile media, such as RAM, ROM, EEPROM, flash memory or other memory technology. The memory can store firmware 340, software 342, network or communication drives 344, executables 346, scripts 348, media content 350, data 352, profiles and/or account information 354, network device ID and/or address 356 and the like.

The user interface 328 allows the user to interact with the media playback device 320 and can include substantially any relevant interface, such as physical buttons, an optical or radio communication interface for communicating with one or more remote controls and other such user interfaces. The medium drive 330 receives a portable storage medium 360 and allows the processor 322 or other relevant components of the media playback device 320 to access content stored on the medium 360. The portable medium can be substantially any portable computer readable medium, such as a disc, flash memory and other such memory. The display 332 can be substantially any relevant display such as, but not limited to, a cathode ray tube display, a liquid crystal display (LCD), plasma display panel, light emitting diode display, and other relevant displays. Similarly, the audio 334 can be substantially any relevant audio drive, device and/or system, such as one or more speakers, speaker drivers and the like.

FIG. 4 shows a simplified block diagram of an example secondary media device 420 that can be utilized in the systems 120, 220 in coordinating with a primary device 122. As introduced above, the secondary device can be substantially any relevant secondary device having multimedia and/or data entry capabilities that can be coordinated with the primary device 122. Some examples of the secondary device can include a computer, laptop, wireless phone, personal digital assistant (PDA), audio player, video player, other consumer electronic devices, and other such devices or combinations of devices.

In some instances, the secondary media device 420 can include one or more processors or controllers 422, one or more communication interfaces 424, one or more memory or computer readable storage 426, user interface 428 and other relevant components such as internal communication links and/or buses (not shown), and the like. Some secondary media devices 420 further optionally include relevant components for use in displaying and/or playing back content, such as a display 432, audio system (e.g., one or more speakers) 434, and other relevant components. Some embodiments optionally my have a memory port and drive (not shown) to receive portable memory, such as a disc, memory stick or the like.

The processor(s) 422 can be one or more microprocessors, minicomputers or other such processing devices or combinations of devices. In some embodiments the processor 422 includes video and/or audio processing functionality, such as decoders, encoders and the like; however, the video and/or audio processing functionality can be implemented through separate devices cooperated with the processor 422. The communication interfaces 424 provide interfaces, ports, connections, antenna and the like through which the secondary media device 420 can communicate with other remote devices and/or communication networks. These communication interfaces can include interfaces such as, but not limited to, a parallel port, an IEEE 1394 serial port, a game port, a USB port, an IR interface, RF interfaces, antenna or other such interfaces.

The memory 426 is coupled with the processor 422 and typically includes one or more processor and/or computer-readable media accessed by at least the processor 422 and can include volatile and/or nonvolatile media, such as RAM, ROM, EEPROM, flash memory or other memory technology. The memory can store firmware 440, software 442, network or communication drives 444, executables 446, scripts 448, media content 450, data 452, a network browser 456, user profile information and the like.

The user interface 428 allows a user to interact with the secondary media device 420 and can include substantially any relevant interface, such as physical buttons, a touch screen, graphical user interface displayed on a display, pointing device (e.g., mouse, trackball, stylus, etc.) and other such user interfaces. The display 432 can be substantially any relevant display such as, but not limited to, a liquid crystal display (LCD), light emitting diode display, and other relevant displays. Similarly, the audio 434 can be substantially any relevant audio drive, device and/or system, such as one or more speakers, speaker drivers, headphone jack and driver, and the like.

Figure 5:
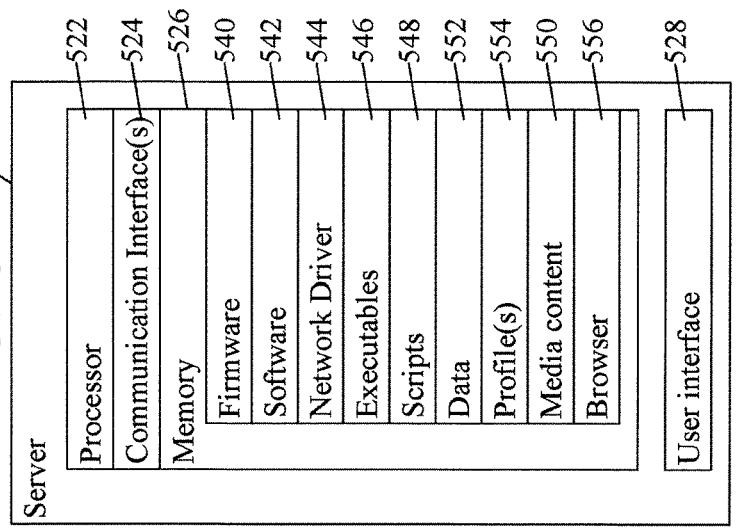
FIG. 5 depicts a simplified block diagram of a network device or server according to some embodiments that can be incorporated into the systems of FIGS. 1 and 2 and communicate over the distribute network with the primary device and the secondary device to coordinate the two devices.

FIG. 5 depicts a simplified block diagram of a network device or server 130 according to some embodiments that can communicate over the distribute network 132 with the primary device 122 and the secondary device 124 to coordinate the two devices. The server can be implemented through a computer or other data processing device and includes one or more processors or controllers 522 and one or more communication interfaces 524. Some embodiments optionally include one or more local memory or computer readable storage 526, user interface 528 (which may include a display and/or audio) and other relevant components such as internal communication links and/or buses (not shown), and the like.

The processor(s) 522 can be one or more microprocessors, minicomputers or other such processing devices or combinations of devices. In some embodiments the processor 422 includes video and/or audio processing functionality, such as decoders, encoders and the like; however, the video and/or audio processing functionality can be implemented through separate devices cooperated with the processor 522. The communication interfaces 524 provide interfaces, ports, connections, antenna and the like through which the server 130 can communicate with the primary device 122 and secondary device 124. Additionally in some instances, the interface provides communication with remote data storage devices 140. These communication interfaces can include interfaces such as, but not limited to, a parallel port, an IEEE 1394 serial port, a USB port, an IR interface, RF interfaces, antenna or other such interfaces.

The memory 526 is coupled with the processor 522 and typically includes one or more processor and/or computer-readable media accessed by at least the processor 522 and can include volatile and/or nonvolatile media, such as RAM, ROM, EEPROM, flash memory or other memory technology. The memory can store firmware 540, software 542, network or communication drives 544, executables 546, scripts 548, media content 550, data 552, profiles and/or account information 554, a network drive and/or browser 556 and the like.

As described above, the server 130 coordinates the primary device 122 and a secondary device 124. In coordinating the primary and secondary devices commands, multimedia content, data, text or the like that is relevant to content on one of the primary or secondary devices can be forwarded to the other of the secondary or primary device. In some representative examples, media content played back at the primary device 122, for example from a portable medium 360, can be identified and content relevant to the identified media content can be communicated to the secondary device 124 or from the secondary device to the primary device 122. For example, when a primary device 122 is playing back a movie from a portable storage medium 360, the primary device 122 can forward a content identification (ID) of the movie to the server. Based on the identified movie, the server can locate additional or supplemental content that is relevant to the identified movie and cause that supplemental content to be forwarded to the secondary device 124. Similarly, the secondary device 124, in some instances, can forward additional content (e.g., content received from a third party over a chatroom service) to the server that is relevant to the identified movie, and the server can forward the additional content to the primary device 122 to be displayed by the primary device, for example, in a sub-window or on a small portion of the display.

In some instances, the media content, for example played back by the primary device 122, is part of a media package that includes one or more media content along with metadata, one or more content identifications, authentications, access keys and/or passwords, authorizations, supplemental content and the like or combinations thereof. The primary device 122 and/or server 130 can utilize the additional data of the content package in determining whether to cooperate the primary device 122 with the secondary device 124, determine whether there is data and/or content to be supplied to the secondary device 124, and/or other such interactions as further described below.

FIG. 6 shows a simplified representation of a content package 620 according to some implementations. The content package 620 includes one or more multimedia content 622 that is to be played back to the user, and one or more content and/or content package ID 626. In some embodiments, the content package optionally includes, one or more control scripts or logic 628, one or more authentications 630, keys 632, passwords, authorizations 634, supplemental content 636, content 640 to be communicated to another device (e.g., to the secondary device 124 for playback and/or display), identity and/or network address 642 of one or more network sources and/or servers 130, linking script 644, additional functions and/or scripts 656, parameters 650, menus 652, graphical user interfaces 654, and other relevant data. The content package 620 can be a physical medium (e.g., Blu-ray disc, HD-DVD, DVD, etc.), streamed content received from over the distributed network 132 or other network, broadcasted content (whether broadcasted wirelessly or over a cable line), pay-per-view, or other such media package.

The multimedia content 622 of the content package 620 can be substantially any multimedia content to be played back such as, but not limited to, video, audio, text, image, picture, graphics and other such content or combinations of content. For example, the content package 620 can comprise a movie and accompanying content and data stored on a portable storage medium 360, where a first multimedia content can be the video and audio of the movie, and a second multimedia content can be video and audio of a trailer for a movie to be released in the future. Again, substantially any multimedia content can be part of a content package 620, and a content package can include multiple multimedia content 622.

In some embodiments, the content ID 626 is an identifier of the content package 620. In some instances, the content ID 626 comprises multiple IDs that identify one or more of the multimedia content 622, the supplemental content 636 and/or coordinated device supplemental content 640. The content ID can be one or more titles, a defined numerical and/or alpha-numerical sequence, a ID or serial number of a portable storage medium (e.g., stored in a burst cut area of the medium), a content source ID or address (e.g., Internet address), content owner and/or distributor ID, description of a subject of content, identified actors, directors or producers, identification of related content and/or content packages, other identifiers and/or combinations of such identifiers. The one or more content ID 626 can be used in identifying the content package 620, and can be forwarded to the server 130 as part of the establishment of the cooperation between the primary device 122 and the secondary device 124.

In some embodiments, the one or more content control scripts 628 provide, in part, the functionality to log into a user account and allow the playback device when implementing a content control script to detect the presence of a secondary device 124 cooperated with the primary device 122. The control scripts 628 can further identify the content package 620 as a content package with the capability to provide for the cooperation between devices. In some instances, one or more of the control script 628 operate to cause the content package to be a trigger detected by the primary device 122 and/or server to activate the log-in and/or cooperation between a secondary device 124, and may cause further control logic to be forwarded from the server to the primary device in implementing the cooperation. The controls script(s) provides operational intelligence to the primary device 122 to allow the primary device to accurately utilize the content package 620, such as determining whether polling is need in communicating with the server or whether a socket can be established.

The authentication(s) 630 can be used in authenticating the media playback device (e.g., primary device 122), the content package 620, the multimedia content 622 and/or the secondary device 124. As an example, the authentication 630 may authenticate the medium disc 360 as a valid and legal disc, and not a pirated or unauthorized duplicated copy of a medium (for example based on a serial number or other identifier, which may be recorded to a burst cut area (BCA)). Based on the authentication 630 a user may have access to supplemental content 636, secondary device supplemental content 640, supplemental content and/or new content accessible from the server 130, database 140 or other source, access to coupons or rights to other content (e.g., other movies distributed by the same studio as the current movie being accessed), rights to download and/or participate in electronic games, rights to additional features or information about one or more of the multimedia content 622, graphics associated with one or more of the multimedia content 622, rights to perform personalization of displayed content and/or functionality provided by the medium 360, and other such authorization and/or combinations of authorization. The encryption key or keys 632 or other such assess rights (e.g., password, tokens, pins or the like) can grant the user with access to protected content. These keys, when included, can provide additional security to multimedia content 622 and/or provide further authentication of valid content.

The network authorization 634 can provide the primary or secondary device 122, 124 with rights to access sources of additional and/or supplemental content, such as through the server 130 and/or database 140 or other third party sources. Supplemental content 636 can optionally be included in the content package 620 to provide the user with additional content, features, games, programs, benefits and/or information. In some instances, the supplemental content is not accessible until authenticated, which can provide users with an incentive to obtain (e.g., through purchasing a medium or purchasing streaming content) valid content. The secondary device supplemental content 640 can include content that is to be forwarded to a secondary device 124 when present and cooperated with the primary device 122, and can be substantially any additional supplemental content, features, programs and the like.

As introduced above with some embodiments, a virtual connection, link or cooperation is established between primary and secondary devices 122, 124 as dictated in some implementations according to the content package 620. A linking script 644 is optionally provided in the content package providing the functionality to the primary device 122 to access the server and implement the log-in and establish the link. Typically, the primary devices 122 have the capability to access the network 132 but typically do not include the functionality needed to establish the connection with the server 130, log-in to the server or to establish the link with the secondary device 124. The linking script 644 is implemented by the primary device 122 to activate the linking between the primary and secondary device.

The content package 620 can provide further functionality to the primary device through one or more additional functions and/or scripts 646 that can be implemented by the primary device. The menus 652 and/or user interfaces 654 can be employed by the primary device, and which menu and/or user interface that is used can depend on a state of the primary device and/or whether a virtual link or cooperation has been established with a secondary device 124. Further, one or more of the menus 652 or user interfaces 654 can be forwarded to the secondary device to provide the secondary device with menus and/or user interfaces that are specifically relevant to the content package 620 and the multimedia content 622. Additionally or alternatively, the server can provide user interfaces, menus and/or content to the secondary device dependent on the content package 620. As a result, the user interfaces and menus available through the secondary device 124 are dependent upon and affected by the content package 620 and/or what is occurring at the primary device 122.

To provide this functionality, some embodiments leverage user registration, player ID, volume ID, serial ID as mechanisms for identifying the local media/user; network APIs inherent in the BD specifications can be utilized to establish online connections (e.g., for players determined to be internet capable, which typically means at least a profile 2.0 capable in the case of BD). Further, a permission file, such as a permission request file (PRF) for BD, can be used to define URLs to which initial connects can be established, but these can then be updated over the internet after the initial connection is established. Further, the content package, such as BD disc, downloaded content or other relevant package includes appropriate software that initiates an online connection, which for example can compensate for an inability to network-enable a disc in the field. Once a playback device has established a connection with a server, the server can take over or transfer the connection to another server to take over and dynamically generate a user interface or provide additional functionality. In some instances, the content package is defined in advance (e.g., software authored on disc) to control the experience and/or control the experience in combination with control from a server based on the availability of a secondary device. For example, the content package can include programming that allows the content package to control or at least partially control the secondary device. Typically, the content package utilizes the server and server control the secondary device based information provided by that content package (e.g., timing, content, queries, requests, code, executables, data, instructions, etc.). For example, similar a disc volume ID or serial number, a secondary device can have or be given one or more identifiers, then the server could arbitrate as to who has access (or limited authorized devices, for example, to limit to a brand or single cooperating or partnered third party).

As identified above and further below, the content package can be stored on a portable storage medium, such as an optical disc (e.g., Blu-ray Disc); however, the content package can be transferred from another device and/or received over the Internet (e.g., streamed content package). The functionality provided by a streamed content package typically can provide the same functionality as a content package recorded on a medium. In some instances, for example, due to limitations on bandwidth, storage and/or functionality capabilities of a device receiving the streamed content some functionality may be limited, however, this limitation is typically due to the device receiving the content package. Once a streamed content package is downloaded, the playback device utilizes the content package to provide the described functionality. In some implementations, the playback device uses content transferred or streamed over the Internet or from some other device, and performs a Virtual File System (VFS) update and reloads the downloaded assets as if they were actually coming from a disc. In connecting with a server, the content package (e.g., stored on an optical disc) directs, through code, the playback device to establish the connection with a server, for example, using a polling mechanism (where disc polls/communicates with server every x seconds to pass data back and forth), a socket connection can be directly established between disc and player or other relevant connections. The secondary device, in some implementations, can similarly be cooperated.

Further, the virtual link or cooperation between the primary and secondary devices 122, 124 is implemented through a user account or profile 554. In some instances, both the primary and secondary devices access the server 130 and are identified as being associated with the same or a single entity, user or consumer. The virtual link can be used to dictate what is displayed on the secondary device 124 based, for example, on content being played back at the primary device 122. Additionally in some implementations, the virtual link allows information to be communicated to the secondary device 124 and/or between the primary and secondary devices 122, 124 indicating, for example, a need to upgrade the primary device (or vice versa). Further as introduced above, the secondary device 124 may, in some instances, establish a supplemental network communication connection that is different than the connection (whether virtual or real) between secondary device 124 and primary device 122 that allows the secondary device to communicate with third parties, third party servers and/or third party databases, for example, allowing a user to participate in a chat session and/or retrieving content through the secondary device.

Some embodiments, as introduced above with FIG. 2, allow a direct connection 224 to be established between the primary device 122 and the secondary device 124. In some implementations the direct connection 224 is established after the link or cooperation is established between the primary device 122 and the secondary device 124, allowing the primary and secondary devices to directly communicate (e.g., Bluetooth, WIFI, wired or the like). The communication between the primary and secondary devices may employ a code or identifier in each communication, which might include a key, password, a pin number, a token or other authentication, a device ID, or the like, to distinguish the communication and allow the receiving device to confirm the origin and/or authentication of the communication. The token (alphanumeric string) can be issued to a primary device that logs into the server, and using the same token through the secondary device the server can confirm the relationship between the two devices.

By cooperating the primary and secondary devices, the secondary device 124, for example, can be utilized to perform functions that are not available or not readily or easily available through the primary device 122. For example, the secondary device 124 can implement a search over the network 132 for content and selecting content such that the selected content is then forwarded to and played back on primary device 122. As a further example, a user can participate through the secondary device 124 in a quiz or poll, and based on input and/or one or more answers entered or selected through the secondary device 124 subsequent content is displayed and/or played back through the primary device 122. Similarly, the secondary device 124, for example, may provide different types of navigation that are not available through the primary device 122 and/or not easily implemented through an interface of the primary device, such as standard remote control.

In some embodiments, the primary device 122 operates differently when a link or cooperation has not been established with a secondary device 124, than when a link or cooperation has been established. For example, the primary device 122 may display supplemental content through the primary device 122 when a secondary device is not linked, and instead forwards the supplemental content to the secondary device 124 when secondary device is linked. Additionally or alternatively, some features and/or content may not be available through the primary device 122 when the secondary device 124 is not linked with the primary device. For example, upgrades to content and/or the primary device 122 may not be available when the secondary device 124 is not linked. As a further example, when a link is not established between the secondary device 124 and the primary device 122, a user cannot interact with a source of additional content or cannot participate in a quiz or poll, and as such, cannot receive instructions and/or additional content in response to the participation.

FIG. 7 depicts a simplified representation of the virtual link 134 established between a primary device 122 and a secondary device in accordance with some embodiments, and a representative cooperation between the primary and secondary devices 122, 124 through the virtual link. The primary device 122 (e.g., a multimedia playback device such as set-top-box, TV, disc player or the like) provides access to and/or playback of content 720, such as playing back a movie recorded on a portable storage medium 360. Further, the primary device 122 communicates over the network 132 with the server 130 allowing the primary device 122 to register and/or log-in to a user account or profile 554. Similarly, the secondary device 124 (e.g., computer, wireless phone, PDA or the like) communicates over the network 132 with the server 130 to register and/or log-in to the same user account or 554. Once each of the primary and secondary devices 122, 124 have logged-in to the user account 554, the server cooperates the two devices and establishes the virtual link 134 between the primary device 122 and the secondary device 124 such that content, commands and/or data can be communicated between the primary and secondary devices, and/or the secondary device is provided with authorization to access services and/or content 724 associated with the multimedia content 720 accessed through the primary device 122. Further, the secondary device can display content 724 relative to the multimedia content being accessed. For example, the secondary device 124 can display a graphical representation 730 of the multimedia content 720 being played back through the primary device 122 (e.g., a representation of the movie being played back on the primary device 122).

In the example depicted in FIG. 7, a user employs the secondary device 124 to access a chat session and/or an instant messaging session associated specifically with the multimedia content 720 played back through the primary device 122 where a chat window 726 is provided to display the chat exchanges. Logging-in through the server 130 to the user account 554 provides, in part, the secondary device with the content ID to allow the secondary device to accurately access the chat or instant messaging session relevant to the content being accessed at the primary device. Additionally in some instances, the server 130 confirms that both devices 122, 124 are associated with the single user account 554 and provides authentication and/or authorization to the secondary device 124 to access the service and/or content 724 directly associated with the multimedia content 720 being played back through the primary device 122. In accessing the chat or instant messaging service, in this example, the user through the secondary device 124 is able to communicate with third party users similarly authorized to access the chat or instant messaging service.

FIG. 8 depicts a simplified representation of the virtual link 134, similar to that of FIG. 7, established between a primary device 122 and a secondary device in accordance with some embodiments with a representative cooperation between the primary and secondary devices 122, 124 through the virtual link 134. In this representation, content is forwarded from the secondary device 124 to the primary device 122, through a direct connection 224 or through the server 130, to be displayed on the primary device in cooperation with the multimedia content 720. For example, as content entries 822 in a chat or instant messaging session are received or entered at the secondary device 124 directly related to the multimedia content 720 played back at the primary device 122, the secondary device forwards the content entries 822 to the primary device 122 that in turn displays at least a portion of content entries 824, for example, in a sub-window 826. As such, some or all of the content 724 at the secondary device 124 that corresponds with the multimedia content 720 played back on the primary device 122 is additionally displayed on primary device 122.

The supplemental content from the secondary device can be synchronized and/or coordinated with the media content playing back in the playback device can be implemented through polling or a socket can be utilized. Additionally or alternatively, a common clock (e.g., on the server) can be used for synchronizing the experience, where synchronization information (such as timecode, chapter points or other such codes) can be passed to both devices and then used for timing model. Another option is to use the primary device/disc as the master, and then broadcast (timecode, location, etc.) to the secondary device. In this latter situation, compensation for network lag may be provided, for example when such lag can be measured, estimated and/or determined, and then adjustments can be implemented based on this lag compensation.

Other communications can be forwarded from the secondary device 124 to the primary device. For example, commands can be issued from the secondary device 124 to affect playback of the multimedia content 720. Further, when more than one secondary devices 124 (e.g., multiple different users with secondary devices) are cooperated, typically through a single account, token or the like, commands can be issued to each other secondary device that in turn can forward the command to a primary device associated only with that secondary device to establish a group playback where one of the users can control playback of the multimedia content of the other users primary devices. In some embodiments, each user may be logged in to multiple accounts (e.g., a user account specific to that user to cooperate the secondary device with the user's primary device, and additionally to a group account to establish a cooperation with other users' devices). In some instances, one user of the group may be the only user with the ability to control other user's primary devices, while in other implementations more than one user of the group can initiate commands to control playback. Further, because the multiple secondary devices are cooperated users can communicate, in some instances, through the secondary devices (e.g., voice call, through a chat session, etc.).

Other content can be forwarded to the primary device 122 from the secondary device 124, and in some instances the other content can be based on information or content provided by the primary device 122. Further, the functionality provided by the secondary device 124 can be utilized that may not otherwise be available through the primary device 122. For example, the secondary device may provide audio, video, textual, graphical content to the primary device 122 that is captured or recorded by the secondary device (e.g., the secondary device 124 can be and/or can include a microphone (audio commentary), camera, web camera, video camera and/or other such devices or functionality). Depending on the kind of content forwarded from the secondary device 124 to the primary device 122 (or vise versa) some transcoding or formatting of content may have to be performed, such as transcoding content to be appropriate for playback on an HD-DVD or Blu-ray player (e.g., audio content would typically need to conform to the audio stream of the HD-DVD or Blu-ray disc—and thus transcoded to the particular codec). This transcoding can be preformed at the secondary device 124 with the knowledge of the type of device the primary device is as provided by the sever 130, or performed by the server.

As a further example, the primary device can forward a version number of the firmware 340, software 342 and/or script 348 to the secondary device 124. The secondary device can, utilizing the network browser 456, implement a search based on the received version number to determine whether upgrades are available for the primary device 122. When upgrades are identified the secondary device can forward the upgrades to the primary device 122 and activate an upgrade to the primary device.

The server 130 in some instances forwards communications between devices, and in some implementations further provides navigation control for the primary and/or secondary device. The navigation, in some instances, can set general parameter registers of, for example, the primary device 122. In many instances the content package 620 is registered based media, for example, many DVD, HD-DVD, Blu-ray and other media content is register based. The navigation control employs a register and/or sets registers to implement the control, separate navigation controls and/or advanced navigation metaphors. The cooperation between the primary and secondary devices can further aid in the navigation and navigation control of content available through the primary device 122, the server 130 and/or the secondary device 124. For example, a plurality of users may register their multimedia players (e.g., HD-DVD players) with the server and create a buddy list with these other users allowing the sharing of information between users. Again, the multimedia player, however, may have limited user interfaces. The users can instead utilize their respective secondary devices 124 to employ navigation of content at one or more of the primary devices. As a further example, user accounts can be associated in buddy lists, where the association and registration can be implemented in part through the secondary device 124, and navigation entered at a secondary device or a third party user associated with the buddy list is further reflected on the primary devices 122 of those users whose accounts are associated with the buddy list. Similarly, book marking, setting scenes, creating playlists can be implemented through the secondary device 124 that is linked through a user account with the primary device 122.

In achieving the virtual link 134 or cooperation between the primary and secondary devices 122, 124, the primary and secondary device in some instances both access and/or log-in to the same user profile or account 554. Upon both accessing the user account the server 130 established the virtual link 134.

Figure 9:
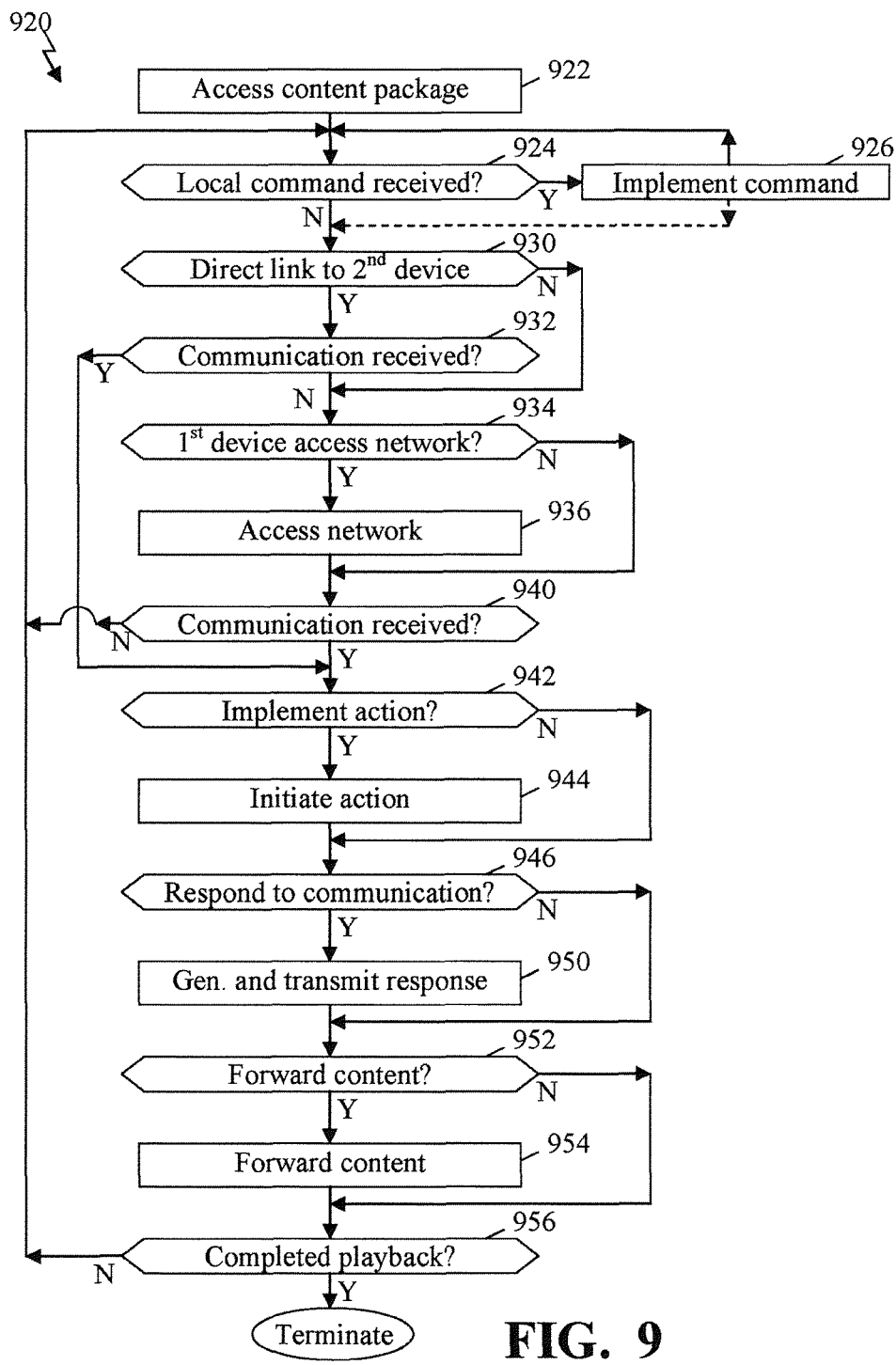
FIG. 9 depicts a simplified flow diagram of a process according to some embodiments in accessing and playing back content at the primary device.

FIG. 9 depicts a simplified flow diagram of a process 920 according to some embodiments in accessing and playing back content, such as multimedia content 720, at the primary device 122. In step 922, the primary device 122 accesses a content package 620 to access multimedia content 622, 720. In some instances, the content package is accessed from a portable storage medium 360 through the media drive 330, received as streaming content from over the distributed network 132, received from a broadcast source, and/or received or accessed through other such methods. Once the content package 620 and the multimedia content 622, 720 is accessed the process 920 advances to step 924 to determine whether a local command is received. The local command may be received by the primary device 122 from a user through, for example, a remote control or other user interface that is directly part of or directly connected (e.g., over a relatively short wireless connection, such as less than 50 feet, typically less than 30 feet and in some instances less than 20 feet) with the playback device, initiated by the local device (e.g., based on script or software instructions) or the like. Examples of local commands can include, but are not limited to, play, stop, fast forward, rewind, pause, skip forward, skip back, and other such commands. In those instances where a local command is detected step 926 is entered and the primary device 122 implements the command, typically through the processor 322. The process 920 then returns to step 924, or in some instances continues to step 930.

Step 930 is entered, in those instances where a local command is not detected (and/or following step 926 in implementing a local command), to determine whether a secondary device 124 is linked or cooperated with the primary device 122 through a direct connection 224. In those instances where a secondary device is linked, the process continues to step 932 to determine whether a communication is received from the secondary device 124. When a communication is received the process 920 skips to step 942.

In those instances where a communication is not received the process continues to step 934 where it is determined whether the primary device 122 is to access the distributed network 132. When network access is to be employed, step 936 is entered and the primary device 122 accesses the network 132 through a communication interface 324 and the network driver 344. Following step 936 and in those instances where it is determined in step 934 that network access is not to be implemented, step 940 is entered where it is determined whether a communication is received from a secondary device 124 over a virtual link 134 (or direct connection 224). When a communication is not received from the secondary device 124 the process 920 returns to step 924.

Alternatively, when a communication is received in step 932 or step 940, the process continues to step 942 where it is determined whether an action is to be implemented by the primary device 122 based on the communication. The action can include implementing a command issued by the secondary device 124, displaying content and other such actions. When action is to be taken step 944 is entered where the appropriate action is initiated. When an action is not to be taken the process continues to step 946 to determine whether to respond to the communication. When a response is to be generated step 950 is entered and an appropriate response is generated and transmitted. Following step 950 and in those instances where it is determined in step 946 that a response is not needed the process 920 continues to step 952 where it is determined whether the primary device 122 is to forward content and/or secondary device supplemental content 640 to the secondary device. Step 954 is entered when content or supplemental content is to be forwarded to the secondary device and the primary device 122 communicates over the virtual link 134 or direct connection 224 the content or supplement content 640 to the secondary device 124. The process then continues to step 956 where it is determined whether the primary device 122 has completed the playback of the multimedia content of the content package 620. In those instances where the playback has not completed, the process 920 returns to step 924 and continues the playback. Alternatively, the process 920 terminates.

The process 920 is a general process implemented by the a multimedia playback device that can be cooperated with a secondary device 124, either over a virtual link 134 or over a direct connection 224 established at least in part through authorization provided by the server 130. In some instances, when it is determined that the primary device 122 is not cooperated with the secondary device the primary device implements the playback of the multimedia content 622 differently than when the secondary device is cooperated with the primary device providing a user with a different experience depending on whether a secondary device 124 is cooperated or linked with the primary device 122. For example, in some embodiments when the secondary device is not linked with the primary device the primary device displays the secondary device supplement content 640, while the secondary device supplemental content is forwarded to the secondary device 124 when linked with the primary device. Alternatively, the secondary device content 640 may not be made available to the user when the secondary device 124 is not linked with the primary device. Further in some instances, the primary device may display one of the plurality of multimedia content (e.g., multimedia content n) of the content package 620 when the secondary device is not linked and does not provide access to the secondary device supplemental content 640; and alternatively does not provide access to the multimedia content n when the secondary device 124 is linked with the primary device 122 and instead forwards the secondary device supplemental content 640 to the secondary device to be displayed and/or played back. As a further example, when the secondary device 124 is linked with the primary device 122, the primary device can display and/or playback additional content from the secondary device 124, the primary device 122 may further reserve a portion of the display 332 to display content received from the secondary device (e.g., by displaying content in a reduced window to maintain the reserved area for the content from the secondary device), and other such differences.

Figure 10:
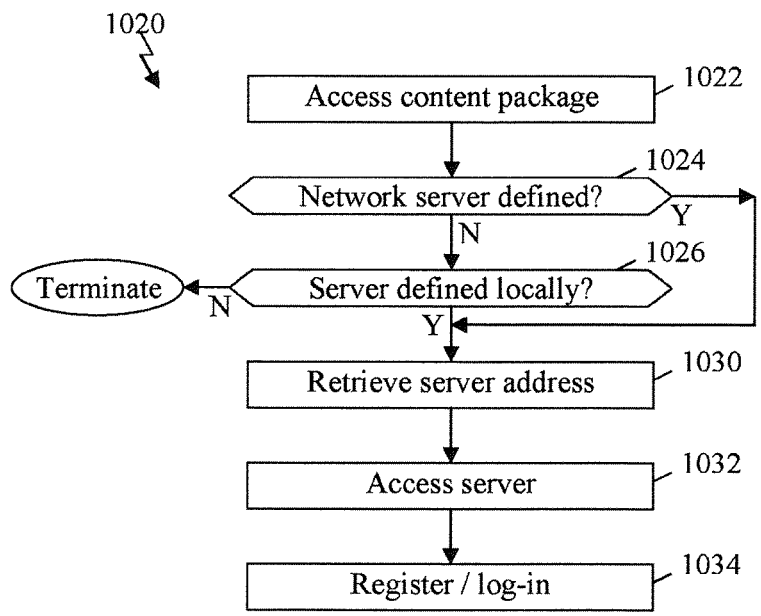
FIG. 10 depicts a simplified flow diagram of a process according to some embodiments to determine whether a first or primary device is to access the network.

FIG. 10 depicts a simplified flow diagram of a process 1020 according to some embodiments to determine whether a first or primary device 122 is to access the network 132. In some instances process 1020 is employed to implement step 934 of the process 920 of FIG. 9. In step 1022 the content package 620 is accessed. In step 1024 it is determined whether an identity and/or address 642 of a network server or source 130 is defined. In those instances where a server 130 is not defined the process continues to step 1026 to determine whether a server 130 is identified and/or the network address 356 of a server is defined locally on the primary device (e.g., in memory 326). When it is determined that a server is not identified the process 1020 terminates, and typically normal playback mode is entered where the primary device 122 provides standard playback of the media content, or in those instances where a direct connection 224 has been established with a secondary device enhanced playback is continued through the cooperation between the cooperated devices.

Alternatively, when a network server or address 642 is defined in the content package 620 or stored locally 356, the process continues to step 1030 where the network server and/or address is retrieved. In step 1032 the network server is accessed over the network 132. In step 1034 the user registers and/or logs in to a user account or profile 554. The log-in can include providing a content package ID 626, an ID of the primary device, a user name, a password, token (issued to another device with which the current device is trying to link) and/or the like, or combinations thereof. In an event that a user account does not exist at the server for the specific user, a registration process can be provided through the server or the server can redirect the user to a third party for registration.

Figure 11:
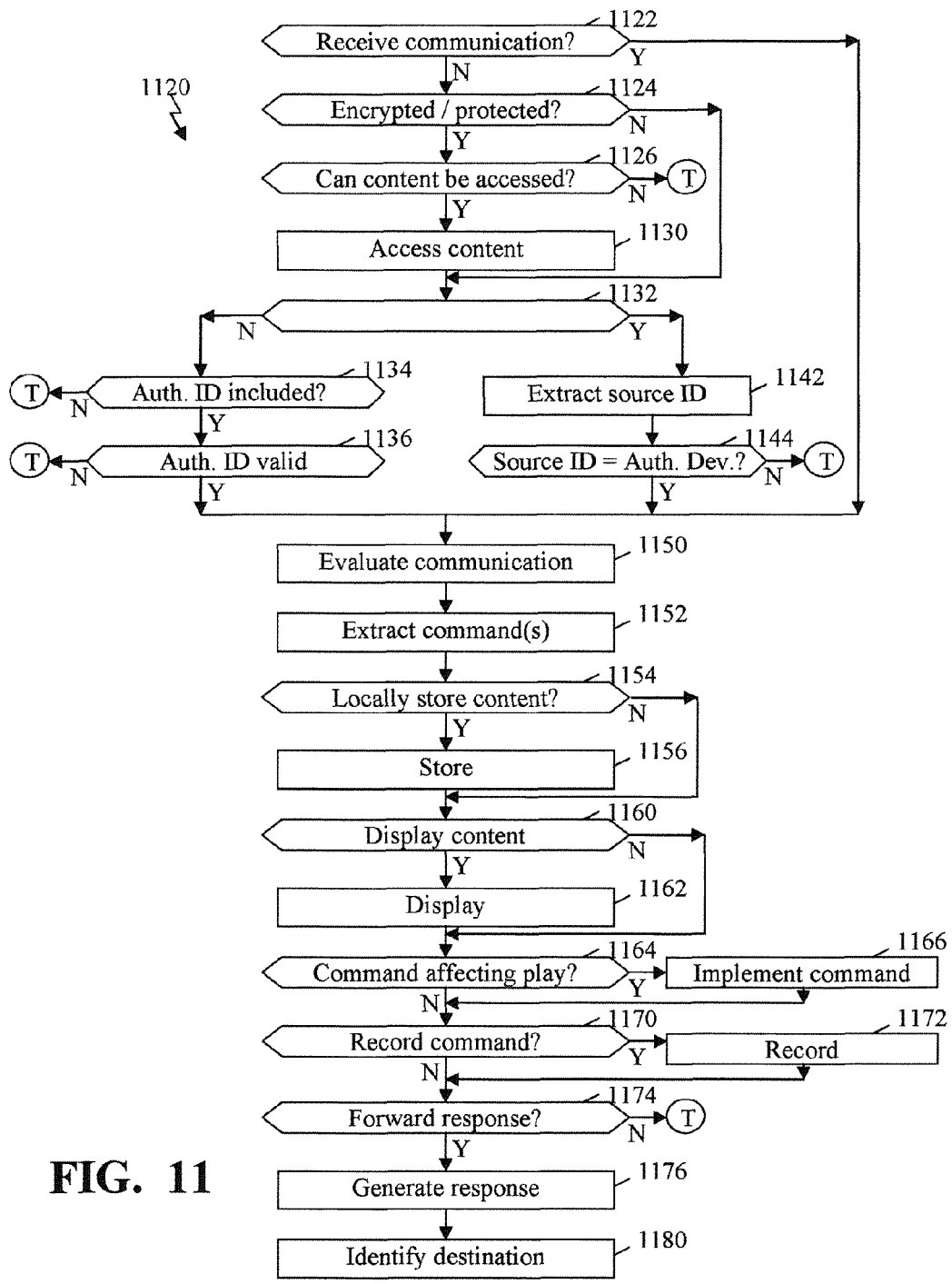
FIG. 11 depicts a simplified flow diagram of a process according to some embodiments that is implemented by the primary device in determining whether one or more actions are to be taken in response to a communication received from a secondary device.

FIG. 11 depicts a simplified flow diagram of a process 1120 according to some embodiments that is implemented by the primary device 122 in deter ruining whether one or more actions are to be taken in response to a communication received from a secondary device 124. In some instances, the process 1120 is employed to implement the step 942 of the process 920 of FIG. 9. In step 1122 it is determined whether a communication is received from the server 130. In those instances where a communication is received from the server the process skips to step 1150. Alternatively, step 1124 is entered to determine whether a received communication contains encrypted and/or otherwise protected content. When content is not protected the process skips to step 1132.

When content is protected step 1126 is entered to determine whether the content can be accessed, for example, through the use of a password, decryption, token, pin or the like. This can include determining whether one or more decryption keys 632 are defined within the content package 620 that relate to the protected content, whether another password, tokens or key is provided by the server or the secondary device and the like. When the protected content cannot be accessed (e.g., decrypted) the process 1120 terminates. Alternatively, the decryption key or password is retrieved in step 1130 and the protected content is accessed.

In step 1132 the communication and/or content is evaluated to determine whether a source ID is defined that identifies the source of the communication. When a source ID is not defined step 1134 is entered to determine whether the communication to the primary device 122 includes an authentication ID. In those instances where there is no authentication ID the process 1120 terminates. Alternatively, the process continues to step 1136 to determine whether the authentication ID is valid. This validation can include comparing the authentication ID with authentications in the content package 620, previous authentication IDs received and the like. Additionally or alternatively, the primary device 122 may initiate a communication with the server 130 requesting verification of the authentication ID. If the authentication ID is not verified the process terminates.

When it is determined in step 1132 that the source ID is defined step 1142 is entered to extract the source ID. In step 1144 a determination is made whether the source ID corresponds with an authorized device. Similar to the authentication ID, the authorized device can be defined in the content package 620, received from the server or verified through communication with the server. In those instances where the source ID does not correspond with an authorized device the process 1120 terminates.

Following steps 1136 and 1144 when the authentication ID or the source ID are verified the process 1120 continues to step 1150 to evaluate the communication and/or content of the communication. In step 1152 one or more commands are extracted from the communication. In step 1154 it is determined whether content is to be locally stored at the primary device 122. In those instances where the content is not to be stored the process skips to step 1160. Alternatively step 1156 is entered and the content is stored.

In step 1160 it is determined whether the content in the communication is to be displayed and/or played back. The content can be substantially any content from the secondary device, and typically is relevant to the multimedia content 622 of the content package, such as additional content, chat or instant messaging content, and/or other relevant content, images, graphics, audio or the like. When the content is not to be displayed the process 1120 skips to step 1164. Alternatively, the content is displayed or played back in step 1162. The content can replace a portion of the multimedia content of the content package 620, displayed over a portion of multimedia content of the content package (e.g., in a sub-window), the size of the multimedia content is reduced to provide room on the display 332 to display the content and/or other such methods. In some instances, the communication and/or content define how the content is to be displayed and/or how the multimedia content is to be altered when displaying the content. Additionally or alternatively, code and/or instructions can be defined with the multimedia content dictating how additional content is to be rendered relative to the multimedia content, which may depend on the type of additional content and/or a source of the additional content.

In step 1164 a determination is made whether a command is present in the communication that affects the playback of the multimedia content 622 of the content package and/or the content from the communication. Command that can affect playback can include, but are not limited to, play, stop, fast forward, rewind, skip, pause and the like. When the communication does not include a command that affects playback the process skips to step 1170. In those instances where the communication does include one or more commands that affect playback step 1166 is entered where the command is implemented. In step 1170 it is determined whether a command or instruction is to be recorded at the primary device 122.

In step 1172 the command or instruction is recorded. In step 1174 it is determined whether a response is to be forwarded to the secondary device 124 and/or the server 130. The process terminates when no response is needed. Alternatively, a response is generated in step 1176 and in step 1180 a destination of the response (e.g., server ID and/or address, secondary device ID, etc.) is identified.

Figure 12:
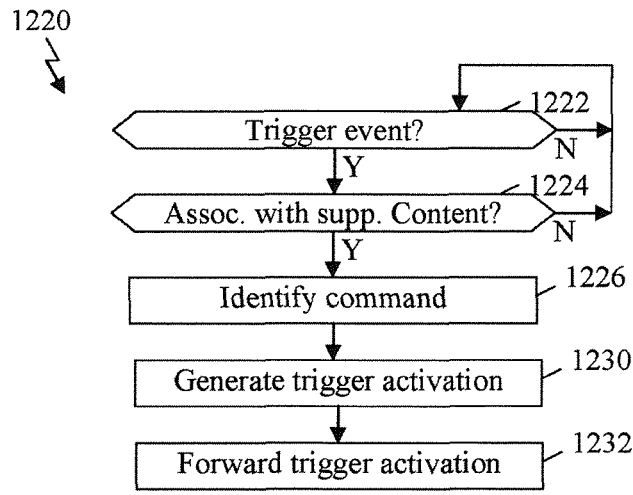
FIG. 12 depicts a simplified flow diagram of a process according to some embodiments for use in synchronizing the playback at the primary device of multimedia content of a content package with content accessible through the secondary device.

FIG. 12 depicts a simplified flow diagram of a process 1220 according to some embodiments for use in synchronizing the playback at the primary device 122 of multimedia content 622 of a content package 620 with content accessible through the secondary device 124. In some embodiments, the content displayed and/or played back at the secondary device 124 is to be synchronized according to the playback of content at the primary device 122. The process 1220 provides the synchronization in some embodiments.

In step 1222 it is determined whether a trigger event occurred at the primary device. The trigger event can include detecting a change in scene boundaries during playback of the multimedia content 622, a change in a chapter of the multimedia content 622, a detection that frame or time code of the multimedia content has been played back or passed, a change of multimedia content (e.g., from multimedia content 1 to multimedia content n), an expiration of a time threshold and/or period, a command entered by the user (e.g., through a remote control in communication with the primary device 122), an implementation or completion of a command received from the secondary device 124 or server 130, or other such triggers events. When no trigger events are detected the process 1220 waits at step 1222 for the detection of a trigger event.

In step 1224 it is determined whether the detected trigger event is associated with the supplemental content received by and/or displayed through the linked secondary device 124. The process returns to step 1222 when the trigger event is not related to the supplemental content at the secondary device 124. Alternatively, step 1226 is entered where a command associated with the trigger event is identified. In some embodiments a look up table is stored at the primary device and/or defined within the content package 620 that associates commands with trigger events. Additionally or alternatively, the trigger event can be forwarded to the server 130 where the server contains a look up table of commands associated with a trigger event. In some instances, the look up table is similarly associated with the multimedia being played back from the content package 620.

In step 1230 a trigger activation is generated that identifies a command for the secondary device 124 to implement and/or forwards content for the secondary device 124 to playback and/or display. The trigger activations can further comprise time codes, commands (e.g., play, stop, skip, fast forward, rewind), instructions to retrieve further content and/or display alternate content, and the like. In step 1232 the trigger activation is communicated from the primary device 122 to the secondary device 124. By issuing trigger activations to the secondary device 124 the content displayed through the secondary device can be synchronized with the playback of content on the primary device 122, and further the secondary device 124 is able to control the content accessed through the secondary device 124 in cooperation and/or synchronization with content played back on the primary device 122. Similar synchronization can be preformed in reverse, where similar processes are performed to synchronize the primary device based on actions, instructions, content accessed at the secondary device and other such factors. In some instances, code is provided within the content package or downloaded to work in conjunction with code defined within the content package to allow the secondary to provide control over the primary device.

In cooperating and synchronizing the two or more devices the content displayed through each device is directly associated with and played back relative to the playback at the other device. The content package 620 at a primary device playing back a movie implements the automated association of the secondary device 124 through the user account based on the knowledge of the specific movie and/or content package currently being played back, the current location of movie progress (e.g., based on time codes and/or other trigger events), and allows for the association and mimicking of content on secondary device 124.

Again the cooperation and linking between the primary and secondary devices 122, 124 is established through the server 130 that identifies that both the primary and secondary devices are to be linked. As described above, the identification that the two devices are to be linked is base, at least in some embodiments, on each device accessing a single user account 554. In some other implementations a user account is not accessed, but instead each device provides the same password, or both devices provide the same authentication. Still other implementations forward an identifier of the secondary device 124 to the primary device 122 and request that the user confirm that the two devices are to be linked, and/or an identifier of the primary device 122 is forwarded to the secondary device 124 with a request that the user at the secondary device confirm that the two devices are to be linked. Typically, however, the server 130 provides the central hub for establishing the cooperation and/or linking between the two (or more) devices.

Figure 13:
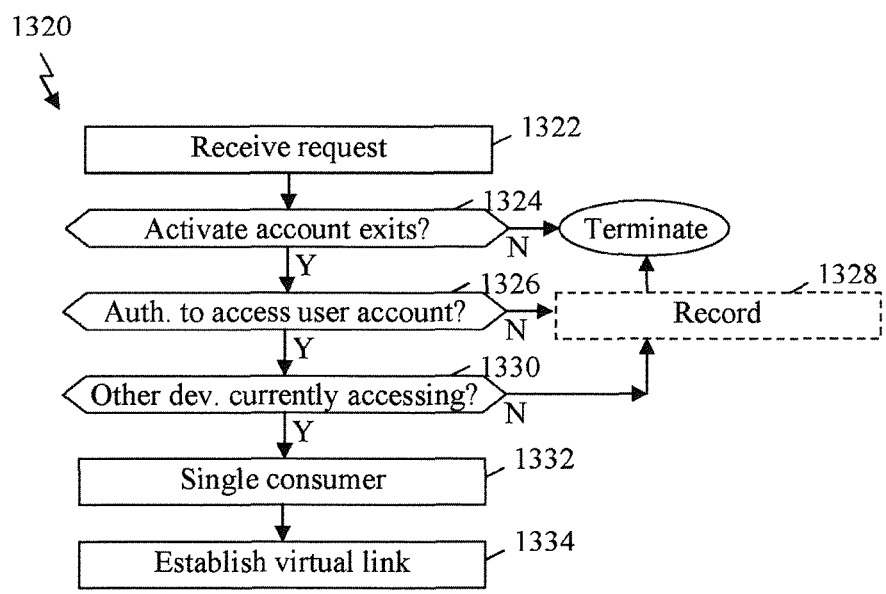
FIG. 13 depicts a simplified flow diagram of a process implemented by the server in establishing the link or cooperation between two or more devices.

FIG. 13 depicts a simplified flow diagram of a process 1320 implemented by the server 130 in establishing the link or cooperation between two or more devices. In step 1322 a request is received from a primary device 122 to access a requested first profile and/or account 554. In some instances the profile or account is associated with a user. In other instances an account may be associated with a content package 620, the primary device, a content owner or distributor and/or other such accounts. Often, the content and/or the functions available to a user is dependent on the account accessed, and the information, content and/or controls that the user can utilize is dependent on the accessed account. In step 1324 it is determined whether an active profile and/or account 554 exists for the requested account. In those instances where an active profile or account does not exist the process 1320 terminates and the user is requested to register.

When an account is active, the process continues to step 1326 to determine whether the primary device is authorized to access the user account 554. This authorization can be based on many factors, such as a primary device ID, a password provided through the primary device, whether a user and/or device is registered and/or other such factors as described above and further below. In those instances where a primary device does not have authorization to access the requested account the process 1320 terminates. Some embodiments additionally include an optional step 1328 of logging or keeping a recording of the attempted access to the requested account. By logging access and/or attempted access information can be tracked about users, devices, accounts and other relevant information for use in optimizing performance of the system 120, 220, maintaining security within the system and other such advantages.

Alternatively, when the primary device has authorization to access the account the process continues to step 1330 to determine whether another device (e.g., a secondary device 124) is currently accessing the same account. Step 1332 is entered in those instances where another device is actively accessing the same account when the user through the primary device is logged-in, and the primary device and the other device actively accessing the account are in some instances defined as a single consumer. Some embodiments optionally notify the users at each device accessing the same account prior to linking the devices, and further some embodiments request authorization to link the devices prior to linking. In step 1334 a virtual link or connection 134 is established through the account 554 between the two or more devices actively accessing the account and the devices are notified of the established cooperation. In those instances where it is determined in step 1330 that another device is not actively accessing the account the process 1320 terminates, and in some instances a log is updated in step 1328 regarding the access to the account. It is further noted that in some embodiments other processes may be activated once a user logs into an account that provides additional, supplemental and/or enhanced content, scripts, features and the like to the primary device 122 without linking the primary device to another device. The process 1320 can be repeated each time a user attempts to access an account through a device and in some embodiments more than two devices can be cooperated and/or linked.

It is noted that an account could be simply a unique user identifier. Other methods of establishing cooperation between the primary and secondary devices can be employed that do not utilize a user account when a secure and mutual association can be established. For example, a server could generate a "code" that could be entered by a consumer to associate two devices together. Additionally or alternatively, a pass code could be defined at one device and the server would establish the connection once the same or a corresponding pass code is provided by the secondary device. Further in some implementations, a temporary user account can be established by the server in response to receiving the matching or accurately related pass codes from each device. Similarly, player ID (e.g., part of BD specifications, and accessible only using AACS online APIs) can be utilized to identify the player, or a player ID could be generated. This player ID could then be transferred from player to server for association with secondary device, for example, via user registration and device registration/exchange.

As described above, by cooperating one or more devices content, commands, instructions and the like can be communicated between devices. As an example, the primary device 122 playing back multimedia content 622 from a content package 620 can once notified of the cooperation can determine whether supplemental content 640 exists within the content package 620 that may be forwarded to the secondary device 124. Similarly, by cooperating the two or more devices the server 130 can forward supplemental content to one or more of the cooperated devices.

Figure 14:
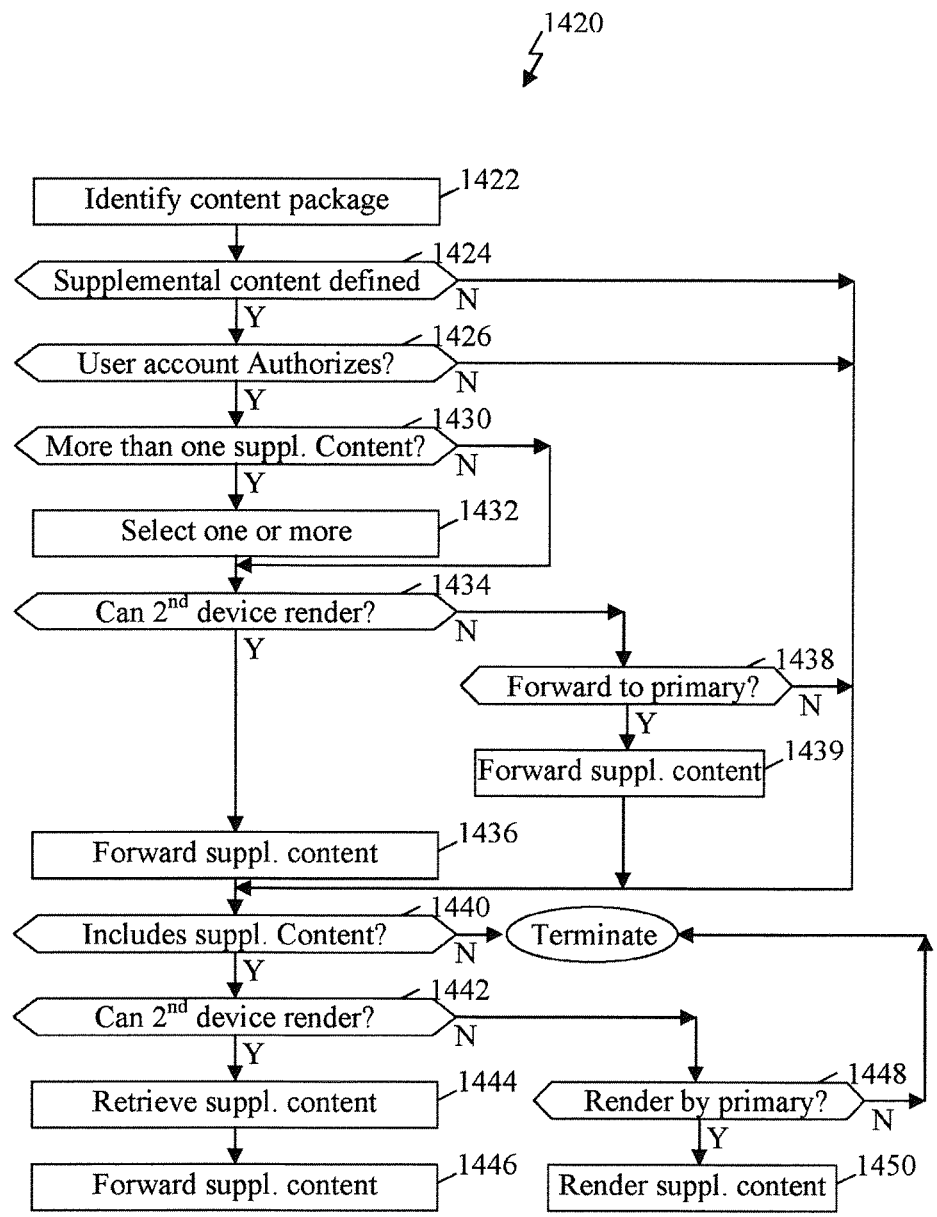
FIG. 14 depicts a simplified flow diagram of a process regarding the forwarding of supplemental content to the secondary device that is linked with a primary device.

FIG. 14 depicts a simplified flow diagram of a process 1420 regarding the forwarding of supplemental content to the secondary device 124 that is linked with a primary device, where the supplemental content is specifically related to the content package 620 being utilized and/or played back through the primary device. As a result, the content accessed through the secondary device 124 is directly affected by the content package 620 accessed through the primary device 122, which can include the playback of multimedia content, menus, user interfaces and the like. In step 1422 the content package 620 and/or multimedia content 622 being accessed through the primary device 122 is identified. This identification is typically based on the content ID 626. In step 1424 it is determined whether supplemental content is defined as being associated with the identified content package 620 and/or multimedia content 622. In those instances where supplemental content is not associated with the content being accessed through the primary device the process skips to step 1440.

Step 1426 is entered when supplemental content is identified where it is determined whether the user account logged into authorizes supplemental content to be forwarded to the secondary device 124. For example, user accounts may have different levels of service (e.g., based on subscription fees or other factors), the supplemental content may require additional payment, whether the supplemental content is appropriate for a user (e.g., based on a user's age defined in the user account, or levels of access defined by a parent, such as G rated content verses PG, PG-13 or other ratings), whether the identified supplemental content was previously forwarded to the secondary device 124 or another device (e.g., some supplemental content may have restrictions on the number of accesses), user account defines a relevance date (where the supplemental content is not forwarded if the supplemental content is no longer relevant or is too old), and other such factors. In those instances where the user account does not authorize the transfer of the supplemental content the process 1420 skips to step 1440.

In step 1430 it is determined whether more than one supplemental content is identified. When only a single supplemental content is identified the process skips to step 1434. Alternatively, step 1432 is entered to identify which of plurality of supplemental content is to be forwarded to the secondary device. The selection of the supplemental content may be based on one or more factors such as, but not limited to, user account, level of service, device type of the secondary device 124, version of firmware 440 of the secondary device 124, identified previously forwarded content and/or supplemental content, date of supplemental content, appropriateness of the supplemental content and other such factors. Some embodiments, the evaluation of whether the user account authorizes whether the content can forwarded may be preformed for each identified supplemental content.

In step 1434 the process determines whether the secondary device 124 can render, playback and/or display the supplemental content. This can be based on the type of device, which may be defined upon logging in to the account (e.g., device ID), user input and/or other such determination. When the secondary device 124 cannot accurately provide access to the supplemental content the process 1420 skips to step 1440 or optionally may continue to step 1438 to determine whether the supplemental content is to be played back by the primary device 122. In those instances where the supplemental content is to be displayed by the primary device step 1439 is entered where the supplemental content is forwarded to the primary device to be displayed. Alternatively, step 1436 is entered where the supplemental content is forwarded to the secondary device 124.

In step 1440 it is determined whether the content package 620 at the primary device 122 contains supplemental content 640 that is to be displayed by the secondary device 124. In those instances where the content package does not include secondary device supplemental content 640, the process 1420 terminates. Alternatively, step 1442 is entered to determine whether the secondary device 124 can render, playback and/or display the supplemental content. In those instances where the secondary device 124 cannot render the supplemental content 640 from the content package 620 the process may terminate or optionally may continue to step 1448. When the secondary device can render or otherwise provide access to the supplemental content 640 step 1444 is entered and the supplemental content 640 is retrieved from the content package 620 at the primary device 122. In step 1446 the supplemental content 640 from the content package 620 is forwarded to the secondary device 124. In optional step 1448 the process determines whether the supplemental content is to be played back by the primary device 122. In those instances where the supplemental content is to be displayed by the primary device step 1450 is entered where the supplemental content is forwarded to the primary device to be displayed. Alternatively, the process terminates.

Figure 15:
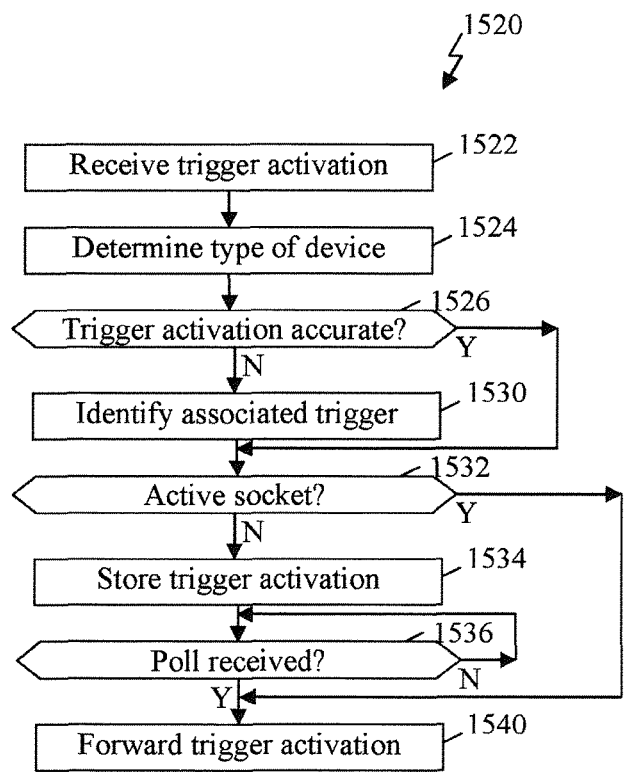
FIG. 15 depicts a simplified flow diagram of a process that is employed in some embodiments in cooperating and/or synchronizing the playback of content at the primary device with the access and/or playback of different or supplemental content at the secondary device.

FIG. 15 depicts a simplified flow diagram of a process 1520 that is employed in some embodiments in cooperating and/or synchronizing the playback of content at the primary device 122 with the access and/or playback of different or supplemental content at the secondary device 124. In step 1522 the server 130 receives a trigger activation, typically from the primary device 122, however, the trigger event in some instances may be received from the secondary device 124. In step 1524 a type of device of the secondary device is determined. This can include determining versions of firmware 440, software 442, scripts 448 and the like that may have an affect on rendering or otherwise utilizing commands received.

In step 1526 it is determined whether the trigger activation is accurate for the device type of the secondary device 124 and/or that the secondary device can accurately utilize the trigger activation. In those instances where the trigger activation is accurate the process skips to step 1532. Alternatively, step 1530 is entered to identify an associated trigger activation specific for the device type of the secondary device 124 and that corresponds to the trigger activation from the primary device 122. In step 1532 it is determined whether an active socket is open with the intended receiving device. In those instances where an active socket is not established step 1534 is entered where the trigger activation or associated trigger activation is stored. Some devices are capable of maintaining an active socket providing substantially an open avenue of communication while other devices rely on polling and/or requests for communications. For example, Blu-ray players often support sockets while HD-DVD players rely on polling. Step 1536 is then entered to determine whether the device intend to receive the trigger activation polls the server or otherwise issues a request to the server to determine whether the server has communications for the device. The process 1520 waits at step 1536 until polling is received. When polling is received or when it is determined in step 1532 that an active socket is maintained the process continues to step 1640 where the trigger activation, or associated trigger activation when appropriate, is forwarded to the secondary device 124. The process 1520 is generally described as forwarding an appropriate trigger to the secondary device. As described above, however, a similar process can be implemented in the reverse direction to identify and forward appropriate triggers to the primary device 122 in response to commands or requests from the secondary device 124.

Figure 16:
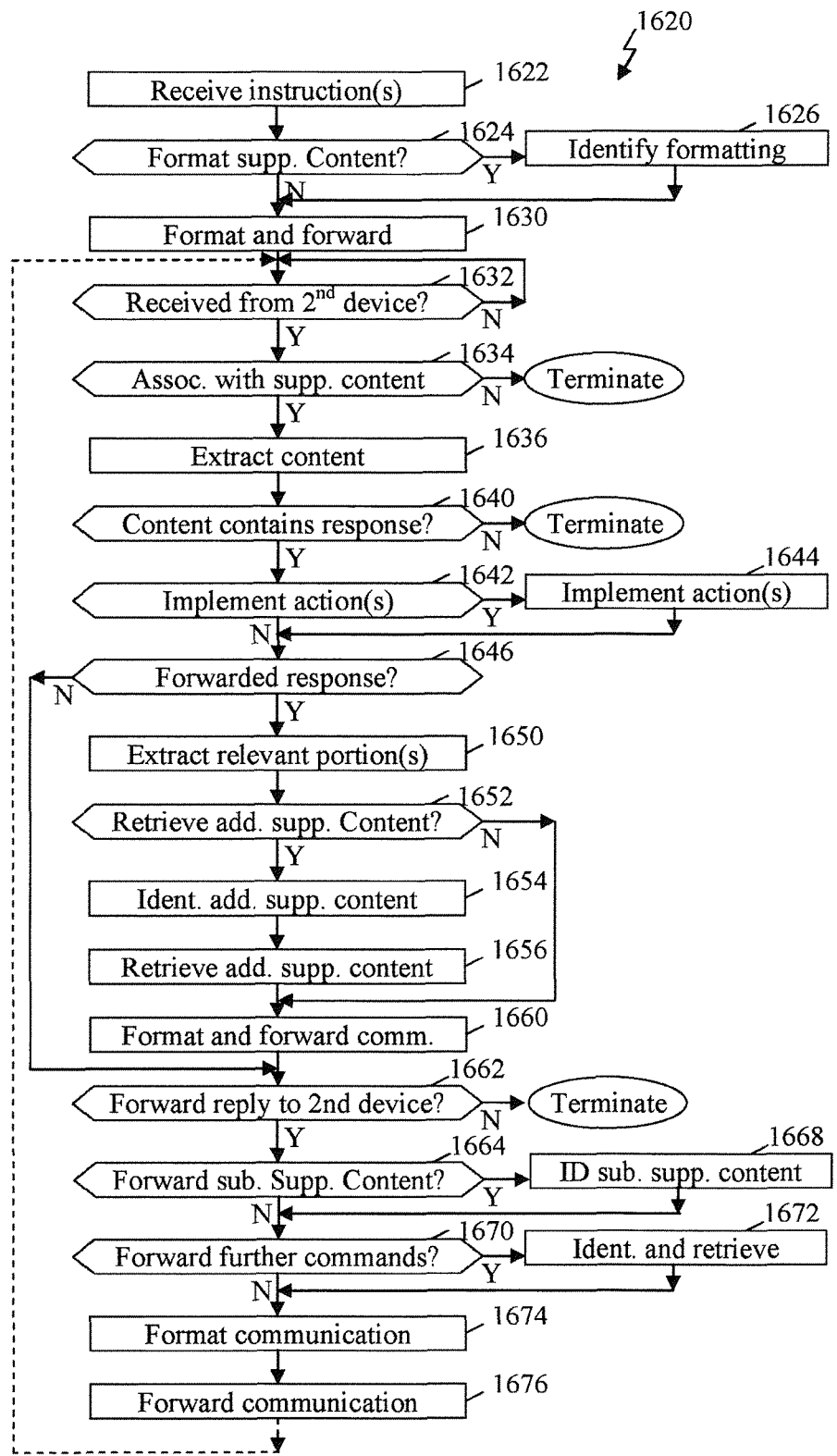
FIG. 16 depicts a simplified flow diagram of a process to interact with a secondary device in forwarding content and/or supplemental content to the secondary device through the server.

FIG. 16 depicts a simplified flow diagram of a process 1620 to interact with a secondary device 124 in forwarding content and/or supplemental content to the secondary device 124 through the server 130. In some embodiments, the process 1620 can be implemented as at least part of one or more of step 1436, 1446 and 1532 in forwarding content to the secondary device 124. Further, the process 1620 is implemented in some implementations when the supplemental content comprises a user interface 654, menus 652, or content with options, selections and/or fields through which a user can interact with the content. In step 1622 an instruction is received through the primary device as issued through the implementation of one or more control scripts 628 and/or a script or functionality 646 of the content package 620 to forward user interactive content to the secondary device. In some instances, the instruction further identifies supplemental content associated with the multimedia content 622 of a content package 620 that includes a text entry field, a user interface or other user interaction functionality. In other instances, the instruction directs the server to identify supplemental content with user interaction functionality based on the content package ID 626, the multimedia content 622 being accessed, time codes, trigger activations and/or other such directions.

In step 1624 it is determined whether the supplemental content is to be formatted for use at the secondary device 124. The formatting can be based on a display size and/or resolution of the secondary device, an encoding scheme that is usable or unusable by the secondary device and other such formatting. For example, the supplemental content may be formatted for a full computer screen while the secondary device 124 may be a wireless phone with a small screen size and low resolution as compared with a computer screen. When no formatting is to be performed the process skips to step 1630.

In step 1626 an appropriate formatting is identified and the supplemental content is formatted in accordance with the identified formatting. The formatting is based the device type of the secondary device 124, the capabilities of the secondary device (e.g., display and/or audio capabilities), version of firmware 440 of the secondary device 124, and other such factors. These factors are determined based on information provided during registration and/or logging in. For example, when a secondary device initially accesses and logs into a user account the server may detect that the secondary device is not registered or associated with the user account and may query the secondary device and/or user for information about the secondary device. In step 1630, the formatted supplemental content is forwarded to secondary device 124. As a result, the content package 620 can, at least in part, control the content displayed through the secondary device 124, and that the content and/or user interfaces provided to the user through the secondary device 124 is dependent on the multimedia content 622 and/or state of access to the content package 620.

In step 1632 a determination is made whether a communication is received from the secondary device 124. When a communication is not received the process waits at step 1632, or optionally may terminate the process or returns to step 1622. When a communication is received, step 1634 is entered to determine whether the communication is associated with the supplemental content forwarded to the secondary device 124. The process 1620 terminates when the communication is not associated with the supplemental content and the server takes other appropriate action. In those instances where the communication is associated with the supplemental content, content is extracted from the communication in step 1636.

In step 1640 it is determined whether the extracted content contains a response, reply, selection or the like directly specified within the supplemental content forwarded to the secondary device 124. Again, the supplemental content can provide an interface, options for selection and/or fields for entering textual string data. As such, the extracted content can include a response to a poll or inquiry, a response typed in a text entry field, a reply to a question, selection of yes or no, selection of one of a plurality of options, selection of further supplemental content, chat room text entry, and other such responses, replies and/or selections. When it is determined in step 1640 that the extracted content does not include a response, reply or selection the process 1620 terminates. Alternatively, step 1642 is entered to determine whether one or more actions are to be implemented locally at server 130 based on the response, reply or selection (e.g., such as accessing additional or alternative supplemental content, verifying authentication or authorization, and other such actions). When an action is not to be implemented locally the process 1620 skips to step 1646.

In step 1644 the server implements the one or more appropriate actions. In step 1646 it is determined whether the response, reply, selection and/or the extracted content of the response is to be forwarded to the primary device 122. When the response or extracted content is not to be forwarded to the primary device 122 the process 1620 advances to step 1662. Alternatively in step 1650, a relevant portion from response, reply or selection is extracted when less than the full response, reply or selection is to be forwarded to the primary device 122. In step 1652 a determination is made whether to retrieve additional supplemental content to be played back as the primary device 122 based on the response, reply and/or selection. When additional supplemental content is to be forwarded step 1654 is entered to identify the additional supplemental content for the primary device 122, and the additional supplemental content is retrieved in step 1656.

Step 1660 is entered following step 1656 and following step 1652 in those instances where additional supplemental content is not to be forwarded to the primary device 122, and a communication is formatted for the primary device and forwarded. In step 1662 it is determined whether a reply is to be forwarded to secondary device 124. The process terminates in those instances where a reply is not to be communicated. Alternatively, step 1664 is entered to determine whether subsequent supplemental content based on response, reply or selection is to be forwarded to the secondary device 124. When subsequent supplemental content is not to be forwarded the process advances to step 1670.

In step 1668 the subsequent supplemental content is identified based on response, reply or selection. In step 1670 it is determined whether further commands are to be forwarded to secondary device 124 in addition to or in alternative to the subsequent supplemental content. The process skips to step 1674 when further commands are not to be directed to the secondary device 124. Alternatively, step 1672 is entered to identify and retrieve relevant command(s). In step 1674 a communication is formatted incorporating the subsequent supplemental content and/or command(s). In step 1676 the communication is forwarded to the secondary device 124. The process 1620, in some embodiments, returns to step 1632 to determine whether one or more further communications are received from the secondary device 124.

The process 1620 provide a method of forwarding content to the secondary device 124, according to some embodiments, and further allows interaction with the secondary device 124 and/or the user through the secondary device. Content and/or user interfaces displayed at the secondary device 124 is dependent on and/or can be dictated, at least in part, by the content package 620 being accessed by the primary device 120. The content package 620, and in some instances, the portion of the multimedia content 622 being accessed, affects what occurs at the secondary device 124 and can affect the control set that a user has access to at the secondary device. Further, responses can be received from the secondary device 124 to affect the playback at the primary device 122, to provide additional supplemental content to the primary device, and/or to provide subsequent supplemental content to the secondary device 124. As an example, a poll or question can be posed to the user through the secondary device 124, and based on the response received further actions can be performed at the server, commands can be issued or forwarded to the primary device 122 and/or content can be forwarded to one or both of the primary and secondary devices.

As an example, a registration form to register with the server can be displayed through though the primary device 122, such as a TV and/or set-top-box. Due to the limited functionality of a TV and a remote control (limited number of buttons and control buttons) the secondary device 124 when cooperated can be utilized by the user to fill in the appropriate entry fields of the registration form. In synchronization with the primary device 122 the secondary device similarly displays the registration form or a portion of the registration form. For example, when the secondary device 124 has a limited display the full registration form is not shown, but instead a small portion or just a single entry field of the form is displayed, which can be implemented through, for example, formatting as described above. Upon typing or otherwise entering data into an entry field, the data (e.g., text) is forwarded to the server 130 to cache or record the entry and, in some instances can further be forwarded to the primary device 122 to be displayed incorporated into the displayed registration form. In some implementations, the entered text or data is not forwarded from the secondary device until a user enters data and/or hits an enter key or option. As such, the text is displayed on the primary device is substantially real time, where some minor delays may occur due to routing over the network and/or processing. Following the entry of data as the secondary device the server forwards a subsequent entry field of the registration form when such formatting is implemented. As such, a user does not have to perform navigation on or through the primary device. In some instances, however, the subsequent entry field may be specifically dictated by a field selected by the user at the primary device 122.

As described above, the linking and/or cooperation between the primary and secondary devices 122, 124 can provide functionality that is not necessarily available through the primary device 122, or that is not easily implemented at the primary device. For example, textual content may be difficult to enter through the primary device (e.g., TV or set-top-box) while the secondary device 124 may have a keyboard (e.g., computer) or keypad that is more appropriate for entering textual content (e.g., wireless phone). Similarly, in some instances a primary device may on its own be unable to implement upgrades to firmware or software. The secondary device, however, can in some instance be utilized to identify whether an upgrade is available and to forward the upgrade to the primary device with instructions to implement the upgrade.

Figure 17:
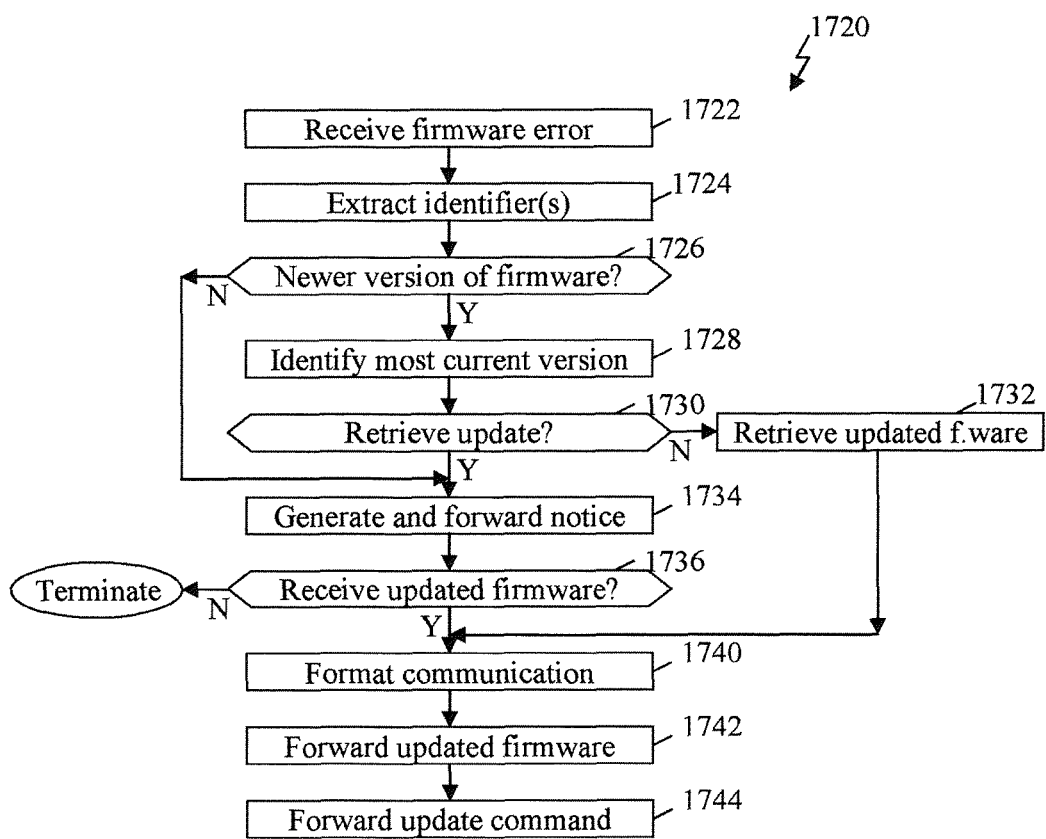
FIG. 17 depicts a simplified flow diagram of a process according to some embodiments to implement an upgrade to a primary device that, typically, is not capable of implementing an upgrade.

FIG. 17 depicts a simplified flow diagram of a process 1720 according to some embodiments to implement an upgrade to a primary device that, typically, is not capable of implementing an upgrade, for example, because in part the primary device 122 is unable to determine a current version, such as a current version of firmware. The description of the process 1720 is presented below with respect to upgrading firmware of the primary device 122. It will be apparent that other upgrades can similarly be implemented. In step 1722 the server 130 receives a firmware error from the primary device 122 indicating that the primary device is incapable of playing back one or more multimedia content 622 of a content package 620, and/or the primary device 122 is incapable of providing some of the options available through the content package 620. In step 1724 one or more error identifiers are extracted. In step 1726 the server attempts to determine whether one or more newer versions of firmware for the primary device 122 are available. The version of firmware may be provided by the primary device 122 upon logging-in on to the server 130 and/or into the user account 554, be provided by the primary device 122 in response to a request from the server or other such methods. In attempting to identify newer versions of firmware the server, in some instances, can issue a request to the user through the secondary device 124 to implement a search for a latest version of firmware for the primary device 122. Additionally, or alternatively, the server can perform a search of a local database based on a device ID, instruct the secondary device 124 to implement a search of third party servers and/or databases over the distributed network 132, and/or request a third party search server to perform a search. In those instances where the server does not identify further upgrades for the primary device 122 the process skips to step 1734.

Alternatively, when one or more newer versions of the firmware 340 are identified step 1728 is entered to identify a most current or newest version of the updated firmware that can be implemented into the primary device 122 and that address one or more of the identified errors. In step 1730 it is determined whether the server 130 can retrieve the updated firmware. This determination can be based in part on whether other sources can be accessed, whether payment is needed, whether user authorization is needed, and other such conditions. When the updated firmware can be retrieved step 1732 is entered and the server 130 retrieves the updated firmware.

Step 1734 is entered in those instances where the server 130 cannot retrieve the updated firmware and a notification is generated and forwarded to the secondary device 124 of the error conditions and the version of the updated firmware that can address one or more of the error conditions. In step 1736 it is determine whether updated firmware is received from the secondary device 124. In those instances where the updated firmware is not received the process 1720 terminates, and in some instances the user is notified through the first and/or secondary devices 122, 124 that the updated is not available.

Following step 1732 where the updated firmware is retrieved and following 1736 when the updated firmware is received from the secondary device 124, the process 1720 continues to step 1740 where a communication is formatted incorporating the updated firmware. In step 1742 the updated firmware is forwarded in the communication to the primary device 122. In step 1744 a command is forwarded to the primary device 122 to implement an update to implement the updated firmware, which in some instances may include receiving user authorization through the primary or secondary device 122, 124.

Figure 18:
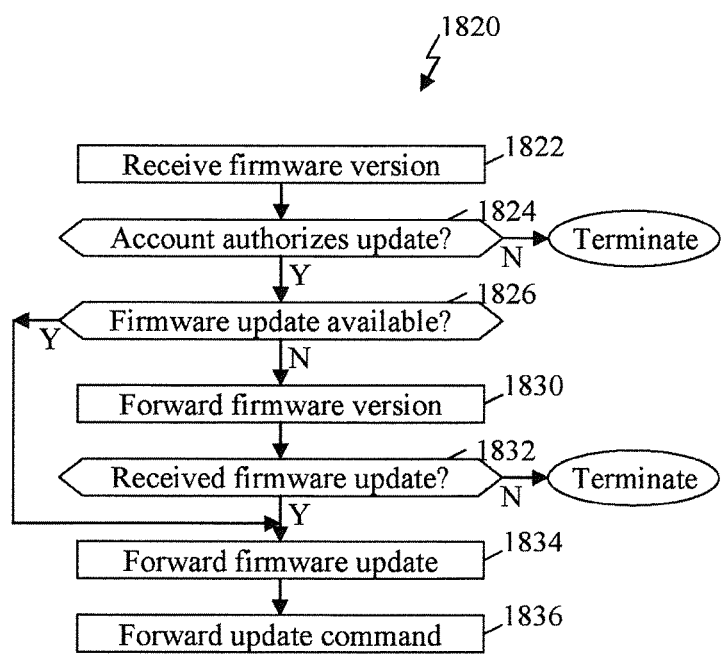
FIG. 18 depicts a simplified flow diagram of an additional process for use in implementing a firmware update of the primary device.

FIG. 18 depicts a simplified flow diagram of an additional process 1820 for use in implementing a firmware update of the primary device 122. In step 1822 a firmware version of the primary device 122 is received at the server 130. In step 1824 it is determined whether an accessed user account authorizes firmware updates. In those instances where the user account does not authorize firmware updates the process terminates. Alternatively, step 1826 is entered to determine whether a firmware update is available through the server 130 for the primary device 122. When the update is available the process 1820 skips to step 1834. Otherwise the process continues to step 1830 to notify the secondary device 124 of the firmware version of the primary device 122.

In step 1832 it is determined whether a firmware update is received from the secondary device 124. When a firmware update is not received the process terminates. Step 1834 is entered when a firmware update is received from secondary device 124 and/or is accessible by the server 130, and the firmware update is forwarded to the primary device 122. In step 1836, a command is forwarded to the primary device to implement a firmware update.

Figure 19:
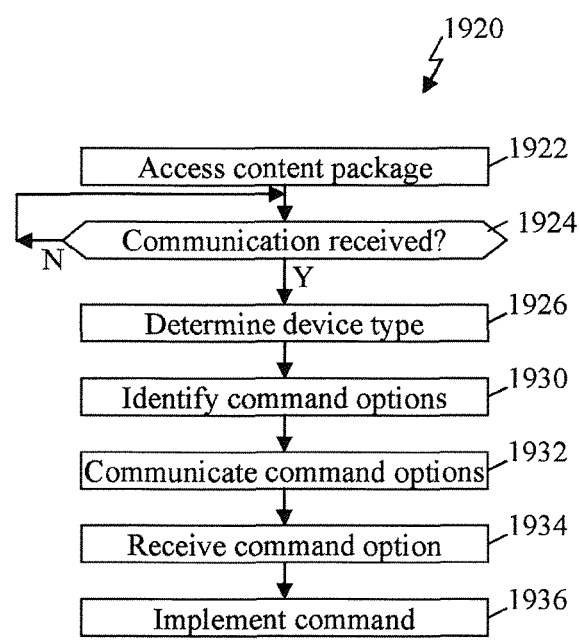
FIG. 19 depicts a simplified flow diagram of a process for cooperating two devices in association with access to and playback of content from a content package.

FIG. 19 depicts a simplified flow diagram of a process 1920 for cooperating two devices in association with access to and playback of content from a content package 620. In step 1922, a content package is locally accessed by a primary device 122. The content package, as described above, includes media content to be locally played back through the primary device 122. In step 1924, it is determined whether a communication is received from a secondary device 124 that has established a virtual link 134 or direct connection 224 with the primary device 122 as described above. When a communication is not received the process returns to step 1924 to await a communication or optionally terminates. In some instances, the process 1920 can be activated at step 1924 upon receiving communications.

In step 1926, a device type of the remote secondary device is determined. In step 1930 the content package is searched to identify command options defined within the content package that are configured to be implemented through the device type of the remote secondary device and that dictate control of local playback of at least a portion of the media content. In some instances, the identifying command options includes identifying one or more subsets of one or more command options that are configured to be implemented through the secondary device 124 and are command options that are generally not available through the primary device 122 and/or not available through, for example, a remote control that is in direct communication with the primary device 122. An one example, a first subset of command options ma be identified that are configured to be implemented through the remote control, while a second set of command options can be identified that cannot be implemented through the remote control.

In step 1932, one or more of the command options are communicated over the virtual link 134 or direct connection 224 to the secondary device 124 (e.g., communicating the second set of command options that cannot be implemented through the remote control). In step 1934, a selection of one of the command options is received from the remote secondary device. In step 1936 the selected one of the commands is identified and implemented to control the playback of the at least the portion of the media content in accordance with the received selected one of the command options.

Again, by cooperating and/or linking two devices a first multimedia playback device, such as a HD-DVD player, that is not capable of implementing a firmware update on its own may utilize the secondary device 124 to obtain a firmware update. Similar functionality that is not provided through the primary device 122 can be utilized and capitalized upon through a secondary device 124 linked with the primary device.

The present embodiments provide the ability to connect and cooperate, and in some instances synchronize, a secondary device (e.g., a personal computer, a mobile device, mobile phone) with a primary device (e.g., home entertainment system, TV, Blu-ray player, HD-DVD player or the like). This cooperation in part overcomes input limitations of many legacy primary devices (e.g., a traditional remote control), as well as interactive and/or display issues of a single display. Some embodiments further enable a user to use a secondary device (such as a computer or mobile/handset device which is already designed for fast text entry) as an alternate method for text entry where, in some instances, the typed text can then immediately (or with minimal latency) appear on the primary device. Further, some embodiments enable a secondary device to be used to remotely control and navigate the primary device and/or content accessed or played back through the primary device (e.g., jump to specific scenes, set bookmarks, can receive navigation information from a friend, buddy list, etc.) and then select which is most interesting using the secondary device which may be more conducive to searching and/or browsing, and selections cause an action on the primary device. Additionally, some embodiments offer secondary or simultaneous experiences in concert with the content playing on the primary device. Still further, some embodiments enable different types of navigation or experiences on the primary device from a secondary device (e.g., not offered by a traditional remote control).

For example, a user input or interface to a primary device (e.g., TV, set-top-box, or other consumer electronic device such as an HD-DVD or Blu-ray player) is a remote control with limited buttons. It can be very difficult to enter information (such as text) on such a primary device and/or implement some navigation through content. In some instances some primary devices provide a "virtual keyboard" concept where an image of a keyboard is displays on the television screen, and then the user can use direction keys (up, down, left right) to select a letter and then click enter to select the letter. Entering text, such as email addresses, sentences or more, can be extremely tedious. Often this limited navigation via a remote control also restricts what is possible from a user (in entertainment) experience, as many more interactive or sophisticated experiences would benefit from navigation or controls that offer more than up, down, left right and then enter to select.

Some embodiment, however, enable users to employ a secondary device 124 (such as a PDA, computer or other mobile/handset device that is readily usable for text entry and/or already designed for fast text entry) as an alternate method for text entry. As a user is accessing content (e.g., watching a movie) through a primary device 122 (e.g., a Blu-ray player) that is connected to a networked, the primary device can access a server 130 over the distributed network 132. The user accesses an associated account or profile with the Blu-ray player via some form of identification of registration (e.g., using a user name and a password, token, pin or other relevant security). Therefore, when the primary device 122 is connected to the server 130 over the network 132, the server can properly identify the user interfacing with the primary device 122. Concurrently and/or while logged in through the primary device 122, the same user using a secondary device (e.g., laptop computer) can connect to the same server (e.g., this time using a web browser on the computer) to log directly into the same online account. Since the same account is used, the server 130 can automatically associate the primary device 122 and the secondary device 124 as the same user or consumer. Once the association has been defined, the online experience of the secondary device (using, for example, a standard web browser) can be tailored based on the knowledge the user is running the identified movie on the primary device 122. As such, the secondary device 124 can now be used, at least in some implementations, to enable text entry using, for example, a keyboard of the secondary device.

Further, the text typed by the user can then immediately (or with minimal latency) be displayed through the primary device 122. In some instances, each keystroke (or button push) of the keyboard (or other buttons) of the secondary device 124 could automatically be display through the primary device. In other instances, for example if latency is an issue, the user can type an entire word, phrase, sentence, or form, and then press <enter> such that the entered text is then communicated to the primary device such that the primary device displays the same information entered on the secondary device. Alternatively in some implementations, the text entered through the secondary device is not necessarily forwarded and/or displayed through the primary device. There may be situations that text entry on the secondary device is sufficient, and redisplaying the same information on the primary device may slow the process, and is often application dependent.

Examples where such text entry through a secondary device 124 may be advantageous can include, but is not limited to:

Entering registration and/or form information, where a user can enter text into a field using, for example, a computer keyboard, and when the user clicks tab or enter to go to a subsequent field, the entered data is forwarded to the primary device to be display on the primary device (or automatically processed).

During an on-line chat session a keyboard of a secondary device 124 can be used for typing the chat text directed to another user, while movie content is displayed and watched by the user through the primary device 122, once a sentence or section of text is entered, clicking the enter key on the keyboard causes the text to be automatically delivered and displayed on the primary device 122 (in some instances, the full text of the chat can be displayed on the primary device 122, for example, where the primary device adjusts a size of the displayed content to simultaneously display the chat content). In another instance, the text is not displayed on the primary device 122, but instead is forwarded directly to another user. If this other user also has access to the same movie, the first user can now send information about the movie (because the secondary device 124 can know based on the established cooperation with the primary device what is currently playing through the primary device) that is synchronized with the movie, or commands and/or navigation points associated with the movie (such as a link to a favorite scene).

Register and/or configure account and/or profile information (e.g., credit card number, e-commerce partners, friends list, etc.) using the secondary device 124, that can further be used in synchronizing with the primary device 122.

Some embodiments additionally or alternatively provide for navigation control on the primary device 122 through the secondary device 124. For example, the secondary device can be used to remotely control and navigate the primary device to implement a jump to specific scenes, set bookmarks, etc. Similarly, a secondary device 124 can receive navigation information from another, typically remote, user (e.g., friend, buddy list, etc.) and a selection of a desired or most interesting navigation can be implemented using the secondary device 124 (which may be more conducive to search, browsing), where the selection can be communicated to the primary device 122 causing an action to be implemented on the primary device. In part, this allows a third party user, not registered with the first user's account (while the third party user may or may not be registered with his/her own account), to provide control and/or commands that can be implemented by the primary media playback device associated with the first user's account. In some instances, the third party user includes an identifier of the first user when forwarding communications and/or commands to the secondary device.

Further, a user can browse third party sources over the network 132 (e.g., browse YouTube) using the secondary device as the secondary device is more conducive and typically faster and intuitive in browsing the network than through the primary device 122 using a remote. Once the user finds desired content a selection can be made using the secondary device, and the selected content is routed to the primary device 122 to be displayed and/or played back. The selection of content through the secondary device 124 to be played back on the primary device 122 can be extended to selecting streaming content (e.g., Netflix), including content that is purchased, such as pay-per-view content, downloaded content (e.g., Amazon Unbox) and other source of content. The user utilizes the secondary device 124 to browse potential content available over the network, and once selected the content is forwarded and played back through the primary device 122.

As described above, in some embodiments, the secondary device 124 can further be used to enable different types of navigation or control on the primary device that may not be offered through the primary device 122 and/or by a traditional remote control. In some instances, a different type of user interface metaphor can be implemented on the secondary device 124, for example, when providing a poll, questionnaire, trivia game, user options or the like. Interaction by the user through the user interface then results in at least partially controlling the primary device 122. Further in the example of a poll or trivia game or other game, a right answer triggers a navigation change on the primary device 122. The navigation is a function of and controlled in accordance with the answer issued to questions.

Further, the secondary device 124 can be used to offer secondary or simultaneous experiences in concert with the primary device 122, where alternative and/or supplemental content is accessed through and/or display on the secondary device 124. Based at least in part on the cooperation between the primary device 122 and the secondary device 124 the secondary device has knowledge of the content being played back through the primary device 122 (e.g., Blu-ray player). With this knowledge, the secondary device 124 can present a user with an experience that is relevant to and/or mimics the experience on the primary device 122. For example, when the primary device is a multimedia player, such as a Blu-ray player, the movie is played back on the primary device multimedia player (not the secondary device, e.g., computer). The movie and/or the menus and formatting of the content of the multimedia content (e.g., movie) may have a specific layout (e.g., look and feel). For example, if there is a chat capability, the chat window may display in the lower right hand corner of the movie screen. The experience at the secondary device can correspond and/or mimic the layout of the primary device, by displaying a graphic representing or image of the movie (e.g., see FIGS. 7 and 8), and further providing a chat window, and in some instances displays the chat window in a same location on the display of the secondary device 124 as displayed on the primary device 122. A level of consistency can thus be established between the primary display experience and the secondary display experience, making the multi-device experience more consumer friendly and intuitive.

The example above provides a method for duplicating, mimicking or creating a consistency between the primary device interface and the secondary interface. Other implementations and/or embodiments, however, utilize the secondary device 124 to display completely separate information from the content being display on the primary device 122. This separate information accessed through the secondary device, however, can be complementary, and synchronized with the content on the primary device. With knowledge of the content on the primary device 122, the secondary device 124 can be used, for example, exclusively for chatting without overlaying, interrupting or changing the display of the primary device 122. The secondary device 124 could also be used for functions such as bookmarking, viewing secondary data and/or supplemental content (e.g., metadata, ancillary graphics, behind the scenes, making of, and other such data or content).

In some embodiments as described above, the primary device 122 forwards content, commands and/or trigger activations to the secondary device 124. Further, data or values entered or received into a set-top-box (representing a primary device in this example) can be forwarded and used in a cooperated secondary device, such as a computer. For example, a set-top-box primary device and a computer secondary device can be cooperated through a user account 554. When a disc is inserted into a set-top-box (or broadcast content is received at the set-top-box), the set-top-box forwards authentication of that disc, BCA, and the like to the server. Upon confirming that the set-top-box has a valid and authenticated content, the computer can be granted access to additional content based on the fact that the set-top-box has an authenticated disc and/or content to prove authenticity. The additional content to which the user is granted access through the computer can be substantially any relevant content, such as content regarding a promotional give away, a download of the movie that is available through the computer, or other such content based on the fact that the set-top-box has an authenticated disc (or content). In some instances, the secondary device (e.g., computer) would not have to be logged in to the user account at the same time the set-top-box is accessing the account and/or authenticating the disc or content. Instead, once the disc and/or content is authenticated a flag or other indicator can be added to the account 554 so that the secondary device can gain access to the additional content at a later time once the secondary device logs into the account. This scenario may be employed as a promotional feature to encourage consumers to purchase a disc or content, and as a bonus the consumer is provided additional content (e.g., a second movie or additional scenes, a director's cut version of a movie, or other such content).

In another example, a secondary device 124 is controlled through commands and/or trigger activations to activate a network browser 456 to access predefined sites or pages in response to content being displayed on a primary device 122. Additionally or alternatively, one or more keywords, terms or phrases can be forwarded from the primary device 122 to the secondary device 124 with instructions that the secondary device is to enter the keyword, term or phase into a search engine to search over the network 132 third party sources. Still other commands and/or instructions from the primary device 122 can active the secondary device 124 to initiate communications, such as transmitting an e-mail, instant message, text message or other messaging, in response to the commands and/or instructions from the primary device 122. Commands, key words, authentication information, a URL, and/or other such information can be pushed from the primary device 122 to the secondary device 124 in response, for example, to embedded information in content at the primary device (e.g., embedded in the multimedia content). The command, key word or other such data or information can be forwarded, for example, in response to content playback, menu selections made at the primary device 122 and/or other such events.

Again as described above, the communication between the primary device 122 and the secondary device 124 can be through a server 130 or through a direct link 134 (e.g., wire, RF, IR, WiFi, Bluetooth, etc.), which may include direct communications such as cellular calls, instant messaging, text messaging and the like. Further, the secondary device can be substantially any relevant device, such as a computer, wireless phone, a secondary set-top player (e.g., in a bedroom that is cooperated with a primary set-top player in a living room with a disc in it such that the secondary set top player is allowed access ton content based on something the set top player in the living room has done or content accessed), PDA, portable audio players, portable video players, and other relevant devices.

Content provided to the secondary device 124 and/or content to which the secondary device is granted access can be substantially any relevant content, and in some instances can depend on the secondary device and its functionalities. For example, a phone number can be forwarded to the secondary device when the secondary device is a phone; a Vcard or other address information can be added to an address book when the secondary device is a computing device that maintains or accesses an address book; an appointment can be added to a calendar or a task added to a task list for secondary devices that provide or have access to calendar and/or task lists.

Further, the initial information, commands, Internet site addresses and the like forwarded to the secondary device can provide the secondary device with additional content. For example, upon receipt of a phone number at a phone secondary device the phone can activate a call to gain access to a special pre-recorded message, or interactive audio menu played. Still further, the secondary device based on the additional content and/or input from a user based on the additional content can then forward back control signals to the primary device. Similarly, a web page accessed through the secondary device 124 that is loaded could have controls that trigger the secondary device to then send control signals to the primary device. For example, a secondary device 124 may provide a user with an opportunity to book a cruise, or make reservations for dinner after watching a movie based on a theme or company promotion (e.g., after watching a movie released by Disney Studios, the secondary device may link the user based on a URL received from the primary device playing back the movie to Disney site that shows a Disney cruise video or Disneyland/Disneyworld video; the secondary device provides access based on a URL received from a primary device playing back a movie to information about a sequel and may provide the user with an opportunity to buy theater movie tickets to the sequel after watching the movie; the secondary device may provide the user with information about ordering another HD-DVD or Blu-ray movie based on other movies enjoyed by other viewers of a movie the user just finished viewing and/or a secondary device can be forwarded instructions to establish and/or maintain a profile that can be develop over time that can be used in making recommendations to the user for other purchases; questions, a survey and/or a poll can be forwarded to the user through the secondary device (e.g., "Did you like this film"); the secondary device can be directed to a web site or information can be forwarded that invites the user to purchase a soundtrack or branded products, apparel or toys associated with content viewed through the primary device; a user may be provided with the opportunity to buy or download ring tones, MP3's, desktops, screen savers, etc.; and other such opportunities and/or access to information).

Furthermore as introduced above, the user experience associated with the access to content can be different when the primary device 122 is cooperated and/or linked with a secondary device 124, then when the primary device is not cooperated with a secondary device. For example, a survey could be varied based on knowledge or capability that a secondary device is available such that in those instances where a secondary device is not available, the primary device would display a simpler survey; whereas, in those instances when a secondary device is detected and available, a more complex and/or comprehensive version of the survey is forward to the secondary device (e.g., now that a more sophisticated input mechanism offered by the secondary device is available). In a more specific example, simple multiple choice options are provided to the user through the primary device when a secondary device is not cooperated, and text entry fields are provided to the secondary device when the secondary device is available allowing the user to type in his/her answers.

In some embodiments, the content, data and/or information provided by the primary device to the secondary device is not utilized by the secondary device to gain access to other content, but instead is to be utilized by the user and/or the secondary device. For example, the secondary device supplemental content 640 can comprise scripts, software, upgrades, ring tones, video files (e.g., WMV files), electronic wallpaper, and/or other such content, information or data.

Again the additional content and/or supplemental content can be directed from the secondary device 124 to the primary device 122, and not just from the primary device to the secondary device. Some embodiments allow a user to create a user generated commentary through the secondary device (e.g., a computer) based on content playing back through a primary device (e.g., multimedia player). As a user is watching a movie on the primary device 122, the user can enter or create a new subtitle track, textual commentary of the movie, add or incorporate graphics, images or overlays, or other such entries. Because the user can employ the secondary device 124 the user can input this data instead of having to pause the movie and use an onscreen keyboard displayed through the primary device 122 every time the user wants to create an annotation, and because the secondary device is cooperated with the primary device the annotation can be displayed through the primary device while the movie is playing back in real time or with minimal delays. Further in some embodiments, the secondary device 124 (e.g., computer) can issue commands to the primary device, for example to pause the movie and then type in an annotation or subtitle that may be forwarded to the primary device to be displayed, and to issue a resume command to continue playback. The present embodiments, in part, take advantage of the features and functionality provided by secondary devices that the primary device does not have. As such, the use of the secondary device, such as a computer, can allow the user to utilize a keyboard of the computer, which is much easier and quicker than using an onscreen keyboard. Additionally, when the text is entered the current pause point can be retrieved (e.g., the secondary device can issue a command to the primary device to identify the pause point), and can be stored along with the entered text. It is noted, as described above, the movie does not have to be paused, but instead a user can type in the commentary through the secondary device as the movie continues to play back through the primary device, and instructions from the secondary device cause the primary device to capture time codes when text is entered, which can be saved with the text to be later played back.

Additionally, many of the above examples described above relate to a secondary device in association with a specific movie or piece of content in the primary device. These capabilities can also be extended and applied to devices that are not necessarily running entertainment content. For example, a secondary device could be used for player-specific functionality such as setup, Internet protocol configuration, and the like.

Some embodiments as described above further provide the capability to allow more than one primary device and one secondary device. Multiple devices provide added functionality and/or additional interaction with other users. For example, multiple secondary devices could be cooperated to enable applications such as interactive games with multiple participants.

Content, such as programming, code, executables and the like, defined within the content package, for example, recorded on an optical disc (e.g., Blu-ray disc) configures the playback device to be cooperated with a secondary device making the multi-device, multi-display experience possible. The cooperation provides the ability to extend and/or push the playback and/or user experience beyond a primary device based on secondary device availability. The content package is authored with the capabilities or "smarts" to enable and/or trigger the cooperation functionality.

For example, the content package can trigger cooperation with social network applications on the secondary device (e.g., Facebook™, Myspace™). As a specific example according to some implementations, the content package, using a content package identifier (e.g., disc ID) in combination of in combination with a user's profile triggers a different experience on the social network (e.g., for chat, for personal expression, something that combines the experience with "my buddies" or other linked users).

Based on what happens on the social network (e.g., how many friends join, solving a game, etc.), the content package could then subsequently enhance or change the playback experience (e.g., movie experience) on the primary device and/or supplemental content forwarded to the secondary device. As a further example, an online community attempting to solve a worldwide puzzle (e.g., advertising gimmick, requesting users to solve a puzzle, or tying a game recorded on a physical media with billboards and actual game elements that are placed around the world and actually require collaboration) can trigger alterations, variations and/or enhancements to the playback experience in response to a progress of the game (e.g., solving a portion or acquiring certain elements triggers the playback of enhanced content that could lead to yet addition portions in completing a game, reaching new levels of a game, providing additional functionality to a secondary device, or other such enhancements to the experience).

As stated above, the functionality to at least initiate and/or establish the cooperation between the primary and one or more secondary devices is defined within the content package. As such the content package is pre-authored to take advantage of a one or more secondary devices, or the content package is pre-authored to be updated over, for example the Internet, to take advantage of one or more secondary devices to expand the experience associated with the content package beyond the primary device, and in some instances, beyond the user associated with or purchaser of the content package. The connectivity functionalities provided by the content package allows the content package to associate with a secondary device. This connectivity can be achieved over a network 132 (the Internet, a local area network, etc.) or a direct connection 224. The connectivity can be established through some password, a shared key, both cooperated devices accessing a single user account, a virtual connection when both devices are connected to a single service or server (e.g., through a user account or established authorization to cooperate the devices) or other such authentications. Further, the content package establish a direct connection 224 with a secondary device, without requiring a third party intermediary (e.g., a network server 130), through some shared password, device ID, key or the like to extend the content package experience beyond the primary device. For example, the content package can be authored to take advantage of BD Touch to allow a direct connection 224 between a primary and one or more secondary devices. Further, a primary device may establish one or more direct connections 224 with one or more secondary devices (e.g., using BD Touch), and simultaneously establish one or more virtual connections 134 with one or more other secondary devices.

The cooperation enabled by the content package allows the experience to be extended beyond the primary device. For example, through the connection (virtual or direct) is established between the primary and secondary devices content, such as enhanced content, previews, portions of a movie or a movie, or a game can be forwarded from the primary device to the secondary device; forwarding identifiers of the content package and/or content within the content package to the secondary device to be maintained in a listing or collection of users content; receiving at the primary device from the secondary device enhanced content, recommendations based on an identifier of a content package or content within the content package, enhanced content and other multimedia, data, etc.; forwarding to the secondary device games from the content package and/or providing authorization for the secondary device to access games or content associated with the content package; and other such capabilities.

The content package is authored with the capabilities or "smarts" to enable and/or trigger the cooperation functionality. Again, the programming can be on burned onto a distributable and/or portable storage medium or other digital recording medium, or streamed or otherwise delivered. For example, when the content package is accessed from a Blu-ray disc, the device cooperation functionality or "smarts" is stored in code, such as BD-Java code, on the disc that established communication with a server to determine availability of secondary device, and then "controls" the experience on primary and secondary devices to extend the experience beyond the primary device. In some instances the content package controls the secondary device by communicating with server to dictate secondary device experience. Similarly, BD-Java code, for example, can be downloaded from a server that provides for the cooperation functionality. In some embodiments, a server can dynamically generate the multi-device extended experience, whether the content package is accessed from disc and/or online, based on available criteria. In this scenario, the above described functionality or "smarts" is on the server, and either primary or secondary device can trigger changes in the experience (arbitrating between inputs).

While the invention herein disclosed has been described by means of specific embodiments and applications thereof, numerous modifications and variations could be made thereto by those skilled in the art without departing from the scope of the invention set forth in the claims.

What is claimed is:

1. A method for use in playing back content, comprising:
accessing, at a playback device configured to playback multimedia content stored on a portable medium, a content package stored on a portable storage medium that is removably accessed on the playback device, wherein the content package comprises media content to be locally played back through the playback device;
detecting, at the playback device and as defined by the content package, whether a remote secondary device is available with which a communication connection can be established;
determining, when it is determined that the remote secondary device is available, whether an authorization to establish the communication connection has been confirmed;
establishing, when it is determined that the authorization to establish the communication connection has been confirmed, the communication connection with the secondary device;
determining, as instructed by the content package and when the communication connection with the secondary device is established, whether one or more commands are received from the secondary device; and
implementing, as instructed by the content package and when it is determined that the one or more commands are received from the secondary device, the one or more commands in controlling playback experience of the media content through the playback device;
identifying, as instructed by the content package and when the communication connection is established, supplemental content to be forwarded to the secondary device; and
transferring, as instructed by the content package and when there is supplemental content to be forwarded to the secondary device, the supplemental content over the established communication connection;
wherein the identifying the supplemental content comprises identifying supplemental content that is exclusively to be played back by the secondary device and that is not to be played back locally.

2. The method of claim 1, wherein the identifying the supplemental content comprises identifying supplemental content within the content package that is to be played back by the secondary device.

3. The method of claim 1, wherein the identifying the supplemental content comprises identifying supplemental content that cannot be played back locally.

4. The method of claim 1, wherein the determining whether the authorization to establish the communication connection has been confirmed comprises:
requesting, from the secondary device, an authorization code;
determining whether the authorization code corresponds with a locally stored authorization; and
implementing, when the authorization code corresponds with the locally stored authorization, the establishing the communication connection.

5. The method of claim 1, wherein the determining whether the authorization to establish the communication connection has been confirmed comprises:
accessing, by the playback device and as instructed by the content package, a remote server;
requesting, from the remote server, an authorization to establish the communication connection with the secondary device;
implementing, at the playback device when the authorization is received from the remote server, the establishing the communication connection.

6. The method of claim 1, further comprising:
initiating, by the playback device and as instructed by code within the content package, a communication connection with the secondary device;
determining, as controlled by the code of the content package, whether an authorization is defined to established the communication connection with the secondary device; and
implementing the determining the device type of the remote secondary device when the authorization is defined.

7. The method of claim 1, further comprising:
playing back, locally through the playback device, at least a portion of the media content of the content package detecting, during the playback of the at least the portion of the media content, a trigger event defined in the at least the portions of the media content; and communicating a trigger activation to the secondary device configured to dictate a playback, at the secondary device, of a corresponding portion of the supplemental content that corresponds with the trigger event.

8. The method of claim 1, wherein the establishing the communication connection with the secondary device comprises:

communiationally coupling over a distributed network the playback device with a remote server accessible over the distributed network;

establishing a virtual connection through the remote server between the playback device and the secondary device such that communications are exchanged over the virtual connection between the playback device and the secondary device.

9. The method of claim 8, further comprising:

determining, at the playback device, whether the virtual connection is established over the distributed network and through the remote server between the playback device and the secondary device;

determining, when the virtual connection is implemented, whether the secondary device is available to playback the supplemental content of the content package; and forwarding the supplemental content to the secondary device when the virtual connection is established and the secondary device is available to playback the supplemental content.

10. The method of claim 8, further comprising:

initiating, through the playback device, logging in to a user account of a plurality of user accounts maintained at the remote server;

wherein the establishing the virtual connection through the remote server comprises confirming that the secondary device has also logged into the user account before establishing the virtual connection between the playback device and the secondary device.

11. The method of claim 1, further comprising:

detecting a firmware version on a first firmware operated through the playback device in playing back the media content;

notifying the secondary device of the firmware version;

receiving, at the playback device, new firmware from the secondary device;

replacing, at the playback device, the first firmware with the new firmware.

12. A content package, comprising:

media content; network access authorization;

authorization to transfer one or more portions of the media content over a distributed network; and code, to be implemented through a media playback device that locally and directly is accessing the content package, that configures the media playback device when implementing the code to:

determine whether a virtual connection, established over the distributed network and through a single user account maintained at a remote server, is implemented between the media playback device and a remote first secondary device;

determine, when the virtual connection is implemented, whether the remote first secondary device is available to playback a first portion of the media content; and forward the first portion of the media content when the first secondary device is available to playback the first portion of the media content;

wherein the code further configures the media playback device to playback a second portion of the media content when the first secondary device is not available to playback the first portion of the media content.

13. A content package, comprising:

media content; network access authorization;

authorization to transfer one or more portions of the media content over a distributed network;

an electronic data file that when transferred into a media playback device causes the media playback device to operate in accordance with a process for use in playing back the media content, the process comprising:

accessing a remote source over a network as defined by the network access authorization;

verifying, through the remote source, an authorization to establish a communication connection with a first secondary device;

communicating a first portion of the media content to the remote source to be forwarded to the first secondary device when the first secondary device is verified as authorized;

playing back a second portion of the media content at the playback device instead of playing back the first portion of the media content when the first secondary device is not authorized.

14. The content package of claim 13, wherein the process further comprises:

receiving a command from the first secondary device through the remote source when the first secondary device is authorized and implementing the command.

15. A method for use in playing back content, comprising:

receiving, over a distributed network and at a server, a first request from a media playback device as initiated by a content package being accessed by the media playback device, where the first request comprises a request to establish a communication connection with a secondary device that is separate from the remote server and the media playback device;

detecting at the server the availability of the secondary device distinct from the media playback device;

identifying the content package at the media playback device, where the content package comprises media content to be played back through the media playback device;

determining whether an authorization is established between the media playback device and the secondary device;

establishing, when it is determined that the authorization is established between the media playback device and the secondary device, a communication connection between the media playback device and the secondary device, wherein the communication is established over the distributed network and through the server;

determining at the server, when it is determined that the communication connection can be established between the media playback device and the secondary device and in accordance with the content package, whether commands are received from the secondary device; and forwarding from the server, when commands are received and the communication connection is established, the commands to the media playback device to be implemented as dictated by the content package through the media playback device.

16. The method of claim 15, wherein the determining whether an authorization is established between the primary device and the secondary device comprises:

receiving a first request from the media playback device, to log into a user account of a plurality of user accounts;

receiving a second request from the secondary device distinct from the media playback device, to log into the user account;

identifying a first supplemental content associated with the content package;

determining, through the user account, whether the first supplemental content is to be forwarded to the secondary device; and forwarding the first supplemental content to the secondary device when the user account authorizes the first supplemental content to be forwarded to the secondary device.

17. The method of claim 16, wherein the identifying the first supplemental content comprises receiving, from the media playback device, the first supplemental content extracted from the content package.

* * * * *

UNITED STATES PATENT AND TRADEMARK OFFICE
CERTIFICATE OF CORRECTION

| | | |
|---|---|---|
| PATENT NO. | : 8,880,714 B2 | Page 1 of 1 |
| APPLICATION NO. | : 14/030956 | |
| DATED | : November 4, 2014 | |
| INVENTOR(S) | : Collart et al. | |

It is certified that error appears in the above-identified patent and that said Letters Patent is hereby corrected as shown below:

In the CLAIMS:
Claim 8, column 53, line 11, delete "communiationally" and insert --communicationally--.

Signed and Sealed this
Fifth Day of May, 2015

Michelle K. Lee
*Director of the United States Patent and Trademark Office*